US011092393B1

(12) United States Patent
Christensen et al.

(10) Patent No.: US 11,092,393 B1
(45) Date of Patent: *Aug. 17, 2021

(54) HEAT TRANSFER FLUIDS AND METHODS OF USE

(71) Applicant: ExxonMobil Research and Engineering Company, Annandale, NJ (US)

(72) Inventors: Gary Christensen, Wenonah, NJ (US); Kevin J. Kelly, Mullica Hill, NJ (US); Shuji Luo, Basking Ridge, NJ (US); Heinrich R. Braun, Tiefenbach (DE); Tobias Klande, Winsen (DE); Behrouz Engheta, Hamburg (DE); Jorg F. W. Weber, Houston, TX (US); Andrew E. Taggi, New Hope, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,897

(22) Filed: Jun. 4, 2020

Related U.S. Application Data

(63) Continuation of application No. 16/447,398, filed on Jun. 20, 2019, now Pat. No. 10,712,105.

(Continued)

(51) Int. Cl.
*C09K 5/10* (2006.01)
*F28F 23/00* (2006.01)

(52) U.S. Cl.
CPC .............. *F28F 23/00* (2013.01); *C09K 5/10* (2013.01)

(58) Field of Classification Search
None
See application file for complete search history.

(56) References Cited

U.S. PATENT DOCUMENTS 1,815,022 A 7/1931 Davis et al.
2,015,748 A 10/1935 Frolich
(Continued)

FOREIGN PATENT DOCUMENTS

EP 0464546 A1 8/1992
EP 0464547 A1 8/1992
(Continued)

OTHER PUBLICATIONS

Development of nanofluids for cooling power electronics for hybrid electric vehicles, Singh et al., (Year: 2013).*

(Continued)

*Primary Examiner* — Peter A Salamon
(74) *Attorney, Agent, or Firm* — Anthony G. Boone

(57) ABSTRACT

This disclosure relates to heat transfer fluids for use in heat transfer systems. The heat transfer fluids comprise at least one non-aqueous dielectric heat transfer fluid. The non-aqueous dielectric heat transfer fluid has density ($\rho$), specific heat ($c_p$), and dynamic viscosity ($\mu$) properties. The heat transfer fluids have a normalized effectiveness factor ($NEF_{fluid}$) as determined by the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime; wherein $DEF_{reference}$ is a dimensional effectiveness factor for a reference fluid that is determined using the same equation (Continued)

Heat conveyance dominated, laminar flow, positive displacement pump

| Product Name | Composition | $\rho$, 40C (g/ml) | $C_p$, 40C (J/g°C) | $\mu$, 40C (cP) | DEF = $\rho^1 c_p^1 \mu^{-1}$ | NEF |
|---|---|---|---|---|---|---|
| Dowtherm® A | Biphenyl 26.5% + diphenyl oxide 73.5% | 1.044 | 1.63 | 2.56 | 0.66 | 1.00* |
| Duratherm S | Siloxane >95% KV100 16.6cSt | 0.947 | 1.72 | 34.60 | 0.05 | 0.07 |
| Coolanol 20 | Organosilicate ester >90% KV100 0.93cSt | 0.880 | 1.98 | 1.76 | 0.99 | 1.49** |
| Coolanol 25 | Organosilicate ester >90% KV100 1.6cSt | 0.895 | 2.05 | 3.58 | 0.51 | 0.77 |
| Fluorinert™ FC-40 | Perfluoro compounds C5-18 KV25 2.2cSt | 1.823 | 1.08 | 2.73 | 0.72 | 1.08** |
| Novec™ 7500 | 3-ethoxy-1,1,1,2,3,4,4,5,5,6,6,6-dodecafluoro-2- | 1.580 | 1.15 | 0.94 | 1.93 | 2.91** |

*Reference fluid.

**Heat transfer fluid of this disclosure.

designated in Table 1 for $DEF_{fluid}$ above for the same selected pump and the same selected heat transfer circuit dominant flow regime; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0. This disclosure also provides a method for improving performance of a heat transfer system, a method for improving performance of an apparatus, and a method for selecting a heat transfer fluid for use in a heat transfer system. The heat transfer fluids and methods of this disclosure are applicable in situations where the heat transfer system is dominated by heat conveyance.

20 Claims, 18 Drawing Sheets

Related U.S. Application Data

(60) Provisional application No. 62/863,385, filed on Jun. 19, 2019.

(56) References Cited

U.S. PATENT DOCUMENTS

| | | |
|---|---|---|
| 2,100,993 A | 11/1937 | Bruson |
| 2,191,498 A | 2/1940 | Reiff |
| 2,387,501 A | 10/1945 | Dietrich |
| 2,655,479 A | 10/1953 | Munday et al. |
| 2,666,746 A | 1/1954 | Munday et al. |
| 2,721,877 A | 10/1955 | Popkin et al. |
| 2,721,878 A | 10/1955 | Popkin |
| 2,817,693 A | 12/1957 | Koome et al. |
| 3,036,003 A | 5/1962 | Dolton, III |
| 3,087,936 A | 4/1963 | Le Suer |
| 3,172,892 A | 3/1965 | Le Suer et al. |
| 3,197,405 A | 7/1965 | Le Suer |
| 3,200,107 A | 8/1965 | Le Suer |
| 3,215,707 A | 11/1965 | Rense |
| 3,219,666 A | 11/1965 | Norman et al. |
| 3,250,715 A | 5/1966 | Wyman |
| 3,254,025 A | 5/1966 | Le Suer |
| 3,272,746 A | 9/1966 | Le Suer et al. |
| 3,275,554 A | 9/1966 | Wagenaar |
| 3,316,177 A | 4/1967 | Dorer |
| 3,322,670 A | 5/1967 | Burt et al. |
| 3,329,658 A | 7/1967 | Fields |
| 3,341,542 A | 9/1967 | Le Suer et al. |
| 3,382,291 A | 5/1968 | Brennan |
| 3,413,347 A | 11/1968 | Worrel |
| 3,438,757 A | 4/1969 | Honnen et al. |
| 3,444,170 A | 5/1969 | Norman et al. |
| 3,449,250 A | 6/1969 | Fields et al. |
| 3,454,555 A | 7/1969 | van der Voort et al. |
| 3,454,607 A | 7/1969 | Le Suer et al. |
| 3,519,565 A | 7/1970 | Coleman |
| 3,541,012 A | 11/1970 | Stuebe |
| 3,544,465 A | 12/1970 | Braid |
| 3,565,804 A | 2/1971 | Honnen et al. |
| 3,595,791 A | 7/1971 | Cohen |
| 3,630,904 A | 12/1971 | Musser et al. |
| 3,632,511 A | 1/1972 | Liao |
| 3,652,616 A | 3/1972 | Watson |
| 3,666,730 A | 5/1972 | Coleman |
| 3,687,849 A | 8/1972 | Abbott |
| 3,697,574 A | 10/1972 | Piasek et al. |
| 3,702,300 A | 11/1972 | Coleman |
| 3,703,536 A | 11/1972 | Piasek et al. |
| 3,704,308 A | 11/1972 | Piasek et al. |
| 3,725,277 A | 4/1973 | Worrel |
| 3,725,480 A | 4/1973 | Traise et al. |
| 3,726,882 A | 4/1973 | Traise et al. |
| 3,742,082 A | 6/1973 | Brennan |
| 3,751,365 A | 8/1973 | Piasek et al. |
| 3,755,433 A | 8/1973 | Miller et al. |
| 3,756,953 A | 9/1973 | Piasek et al. |
| 3,769,363 A | 10/1973 | Brennan |
| 3,787,374 A | 1/1974 | Adams |
| 3,798,165 A | 3/1974 | Piasek et al. |
| 3,803,039 A | 4/1974 | Piasek et al. |
| 3,822,209 A | 7/1974 | Knapp et al. |
| 3,876,720 A | 4/1975 | Heilman et al. |
| 3,948,800 A | 4/1976 | Meinhardt |
| 4,100,082 A | 7/1978 | Clason et al. |
| 4,149,178 A | 4/1979 | Estes |
| 4,218,330 A | 8/1980 | Shubkin |
| 4,234,435 A | 11/1980 | Meinhardt et al. |
| 4,239,930 A | 12/1980 | Allphin et al. |
| 4,367,352 A | 1/1983 | Watts et al. |
| 4,413,156 A | 11/1983 | Watts et al. |
| 4,426,305 A | 1/1984 | Malec |
| 4,434,408 A | 2/1984 | Baba et al. |
| 4,454,059 A | 6/1984 | Pindar et al. |
| 4,594,172 A | 6/1986 | Sie |
| 4,767,551 A | 8/1988 | Hunt et al. |
| 4,798,684 A | 1/1989 | Salomon |
| 4,827,064 A | 5/1989 | Wu |
| 4,827,073 A | 5/1989 | Wu |
| 4,897,178 A | 1/1990 | Best et al. |
| 4,910,355 A | 3/1990 | Shubkin et al. |
| 4,921,594 A | 5/1990 | Miller |
| 4,943,672 A | 7/1990 | Hamner et al. |
| 4,952,739 A | 8/1990 | Chen |
| 4,956,122 A | 9/1990 | Watts et al. |
| 4,975,177 A | 12/1990 | Garwood et al. |
| 5,068,487 A | 11/1991 | Theriot |
| 5,084,197 A | 1/1992 | Galic et al. |
| 5,275,749 A | 1/1994 | Kugel et al. |
| 5,430,105 A | 7/1995 | Redpath et al. |
| 5,705,458 A | 1/1998 | Roby et al. |
| 6,034,039 A | 3/2000 | Gomes et al. |
| 6,080,301 A | 6/2000 | Berlowitz et al. |
| 6,090,989 A | 7/2000 | Trewella et al. |
| 6,165,949 A | 12/2000 | Berlowitz et al. |
| 6,323,164 B1 | 11/2001 | Liesen et al. |
| 7,704,930 B2 | 4/2010 | Deckman et al. |
| 8,048,833 B2 | 11/2011 | Habeeb et al. |
| 9,206,379 B2 | 12/2015 | Smith |
| 9,340,720 B2 | 5/2016 | Singh et al. |
| 10,149,413 B1 | 12/2018 | Dede et al. |
| 2002/0191430 A1 | 12/2002 | Meir |
| 2004/0086757 A1* | 5/2004 | Mohapatra ............... C09K 5/10 429/437 |
| 2008/0020950 A1 | 1/2008 | Gray et al. |
| 2009/0301691 A1* | 12/2009 | Mohapatra .......... F28D 15/0266 165/104.17 |
| 2011/0001081 A1* | 1/2011 | Singh ...................... C09K 5/10 252/73 |
| 2011/0175017 A1* | 7/2011 | Mohapatra ............... C09K 5/10 252/71 |
| 2012/0164506 A1* | 6/2012 | Claeys .................... C07C 69/28 429/120 |
| 2018/0097265 A1 | 4/2018 | Tarlau et al. |
| 2018/0100114 A1 | 4/2018 | Gao et al. |
| 2018/0100115 A1 | 4/2018 | Gao et al. |
| 2018/0100117 A1 | 4/2018 | Flores-Torres et al. |

(56) References Cited

U.S. PATENT DOCUMENTS

| | | |
|---|---|---|
| 2018/0100118 A1 | 4/2018 | Flores-Torres et al. |
| 2018/0100120 A1 | 4/2018 | Flores-Torres et al. |

FOREIGN PATENT DOCUMENTS

| | | |
|---|---|---|
| EP | 0471071 B1 | 8/1995 |
| GB | 1350257 A | 4/1974 |
| GB | 1390359 A | 4/1975 |
| GB | 1429494 A | 3/1976 |
| GB | 1440230 A | 6/1976 |
| WO | 2008051126 A1 | 5/2008 |

OTHER PUBLICATIONS

Arshad et al, "A Review on Graphene Based Nanofluids: Preparation, Characterization and Applications", Journal of Molecular Liquids, 2019, vol. 279, pp. 444-484.

Asadi, "A Guideline Towards Easing the Decision-Making Process in Selecting an Effective Nanofluid as a Heat Transfer Fluid", Energy Conversion and Management, 2018, vol. 175 pp. 1-10.

Huminic et al, "Heat Transfer Capability of the Hybrid Nanofluids for Heat Transfer Applications", Journal of Molecular Liquids, 2018, vol. 272, pp. 857-870.

Suganthi et al, "Metal Oxide Nanofluids: Review of Formulation, Thermo-Physical Properties, Mechanisms, and Heat Transfer Performance", Renewable and Sustainable Energy Reviews, 2017, vol. 76, pp. 226-255.

Timofeeva et al, "Development of Nanofluids for Cooling Power Electronics for Hybrid Electric Vehicles", Argonne National Laboratory Presentation, 2014.

Yu et al, "Study of the Thermal Effectiveness of Laminar Forced Convection of Nanofluids for Liquid Cooling Applications", IEEE Transactions on Components, Packaging and Manufacturing Technology, Oct. 2013, vol. 3, No. 10.

Zyla et al, "Viscosity, Thermal and Electrical Conductivity of Silicon Dioxide-Ethylene Glycol Transparent Nanofluids: An Experimental Studies", Thermochimica Acta, 2017, vol. 650, pp. 106-113.

The International Search Report and Written Opinion of PCT/US2020/038291 filed Jun. 18, 2020.

* cited by examiner

Heat conveyance dominated, laminar flow, positive displacement pump

| Product Name | Composition | $\rho$, 40C (g/ml) | $C_p$, 40C (J/g°C) | $\mu$, 40C (cP) | DEF = $\rho^1 C_p^1 \mu^{-1}$ | NEF |
|---|---|---|---|---|---|---|
| Dowtherm® A | Biphenyl 26.5% + diphenyl oxide 73.5% | 1.044 | 1.63 | 2.56 | 0.66 | 1.00* |
| Duratherm S | Siloxane >95% KV100 16.6cSt | 0.947 | 1.72 | 34.60 | 0.05 | 0.07 |
| Coolanol 20 | Organosilicate ester >90% KV100 0.93cSt | 0.880 | 1.98 | 1.76 | 0.99 | 1.49** |
| Coolanol 25 | Organosilicate ester >90% KV100 1.6cSt | 0.895 | 2.05 | 3.58 | 0.51 | 0.77 |
| Fluorinert™ FC-40 | Perfluoro compounds C5-18 KV25 2.2cSt | 1.823 | 1.08 | 2.73 | 0.72 | 1.08** |
| Novec™ 7500 | 3-ethoxy-1,1,1,2,3,4,4,5,5,6,6,6-dodecafluoro-2- | 1.580 | 1.15 | 0.94 | 1.93 | 2.91** |

*Reference fluid.

**Heat transfer fluid of this disclosure.

Fig. 1

Heat conveyance dominated, laminar flow, positive displacement pump

| Product Name | Composition | $\rho$, 40C (g/ml) | $C_p$, 40C (J/g°C) | $\mu$, 40C (cP) | DEF = $\rho^1 C_p^1 \mu^{-1}$ | NEF |
|---|---|---|---|---|---|---|
| Dowtherm® A | Biphenyl 26.5% + diphenyl oxide 73.5% | 1.044 | 1.63 | 2.56 | 0.66 | 1.00* |
| Esterex™ M11 | C16 paraffinic monoester | 0.848 | 2.240 | 2.670 | 0.71 | 1.07** |
| Esterex™ A32 | C8-C13 Branched chain dialkyl adipate esters | 0.911 | 2.160 | 8.203 | 0.24 | 0.36 |
| Exxate™ 900 | Acetate from C8-10 branched alcohol (C9 Rich) | 0.855 | 1.856 | 1.428 | 1.11 | 1.67** |
| SpectraSyn™ 2C | Polyalpha olefin | 0.786 | 2.409 | 5.309 | 0.36 | 0.54 |

*Reference fluid.

**Heat transfer fluid of this disclosure.

Fig. 1 (Cont.)

Heat conveyance dominated, transition (Blasius) flow, positive displacement pump

| Product Name | Composition | $\rho$, 40C (g/ml) | $C_p$, 40C (J/g°C) | $\mu$, 40C (cP) | DEF = $\rho^{0.25} C_p^{1} \mu^{-0.25}$ | NEF |
|---|---|---|---|---|---|---|
| Dowtherm® A | Biphenyl 26.5% + diphenyl oxide 73.5% | 1.044 | 1.63 | 2.56 | 1.30 | 1.00* |
| Duratherm S | Siloxane >95% KV100 16.6cSt | 0.947 | 1.72 | 34.60 | 0.70 | 0.54 |
| Coolanol 20 | Organosilicate ester >90% KV100 0.93cSt | 0.880 | 1.98 | 1.76 | 1.67 | 1.28** |
| Coolanol 25 | Organosilicate ester >90% KV100 1.6cSt | 0.895 | 2.05 | 3.58 | 1.45 | 1.11** |
| Fluorinert™ FC-40 | Perfluoro compounds C5-18 KV25 2.2cSt | 1.823 | 1.08 | 2.73 | 0.97 | 0.75 |
| Novec™ 7500 | 3-ethoxy-1,1,1,2,3,4,4,5,5,6,6,6-dodecafluoro-2- | 1.580 | 1.15 | 0.94 | 1.31 | 1.01** |

*Reference fluid.

**Heat transfer fluid of this disclosure.

Fig. 1 (Cont.)

Heat conveyance dominated, transition (Blasius) flow, positive displacement pump

| Product Name | Composition | $\rho$, 40C (g/ml) | $C_p$, 40C (J/g°C) | $\mu$, 40C (cP) | DEF = $\rho^{0.25} C_p^1 \mu^{-0.25}$ | NEF |
|---|---|---|---|---|---|---|
| Dowtherm® A | Biphenyl 26.5% + diphenyl oxide 73.5% | 1.044 | 1.63 | 2.56 | 1.30 | 1.00* |
| Esterex™ M11 | C16 paraffinic monoester | 0.848 | 2.240 | 2.670 | 1.68 | 1.29** |
| Esterex™ A32 | C8-C13 Branched chain dialkyl adipate esters | 0.911 | 2.160 | 8.203 | 1.25 | 0.96 |
| Exxate™ 900 | Acetate from C8-10 branched alcohol (C9 Rich) | 0.855 | 1.856 | 1.428 | 1.63 | 1.25** |
| SpectraSyn™ 2C | Polyalpha olefin | 0.786 | 2.409 | 5.309 | 1.49 | 1.15** |

*Reference fluid.

**Heat transfer fluid of this disclosure.

Fig. 1 (Cont.)

Heat conveyance dominated, laminar flow, centrifugal pump

| Product Name | Composition | $\rho$, 40C (g/ml) | $C_p$, 40C (J/g°C) | $\mu$, 40C (cP) | DEF = $\rho^{0.19} C_p^1 \mu^{-0.19}$ | NEF |
|---|---|---|---|---|---|---|
| Dowtherm® A | Biphenyl 26.5% + diphenyl oxide 73.5% | 1.044 | 1.63 | 2.56 | 1.37 | 1.00* |
| Duratherm S | Siloxane >95% KV100 16.6cSt | 0.947 | 1.72 | 34.60 | 0.87 | 0.63 |
| Coolanol 20 | Organosilicate ester >90% KV100 0.93cSt | 0.880 | 1.98 | 1.76 | 1.74 | 1.26** |
| Coolanol 25 | Organosilicate ester >90% KV100 1.6cSt | 0.895 | 2.05 | 3.58 | 1.57 | 1.15** |
| Fluorinert™ FC-40 | Perfluoro compounds C5-18 KV25 2.2cSt | 1.823 | 1.08 | 2.73 | 1.00 | 0.72 |
| Novec™ 7500 | 3-ethoxy-1,1,1,2,3,4,4,5,5,6,6,6-dodecafluoro-2- | 1.580 | 1.15 | 0.94 | 1.27 | 0.92 |

*Reference fluid.

**Heat transfer fluid of this disclosure.

Fig. 1 (Cont.)

Heat conveyance dominated, laminar flow, centrifugal pump

| Product Name | Composition | $\rho$, 40C (g/ml) | $C_p$, 40C (J/g°C) | $\mu$, 40C (cP) | DEF = $\rho^{0.19} C_p^1 \mu^{-0.19}$ | NEF |
|---|---|---|---|---|---|---|
| Dowtherm® A | Biphenyl 26.5% + diphenyl oxide 73.5% | 1.044 | 1.63 | 2.56 | 1.37 | 1.00* |
| Esterex™ M11 | C16 paraffinic monoester | 0.848 | 2.240 | 2.670 | 1.80 | 1.31** |
| Esterex™ A32 | C8-C13 Branched chain dialkyl adipate esters | 0.911 | 2.160 | 8.203 | 1.42 | 1.04** |
| Exxate™ 900 | Acetate from C8-10 branched alcohol (C9 Rich) | 0.855 | 1.856 | 1.428 | 1.68 | 1.22** |
| SpectraSyn™ 2C | Polyalpha olefin | 0.786 | 2.409 | 5.309 | 1.68 | 1.22** |

*Reference fluid.

**Heat transfer fluid of this disclosure.

Fig. 1 (Cont.)

Heat conveyance dominated, transition (Blasius) flow, centrifugal pump

| Product Name | Composition | $\rho$, 40C (g/ml) | $C_p$, 40C (J/g°C) | $\mu$, 40C (cP) | $DEF = \rho^{0.04} C_p^1 \mu^{-0.04}$ | NEF |
|---|---|---|---|---|---|---|
| Dowtherm® A | Biphenyl 26.5% + diphenyl oxide 73.5% | 1.044 | 1.63 | 2.56 | 1.57 | 1.00* |
| Duratherm S | Siloxane >95% KV100 16.6cSt | 0.947 | 1.72 | 34.60 | 1.49 | 0.95 |
| Coolanol 20 | Organosilicate ester >90% KV100 0.93cSt | 0.880 | 1.98 | 1.76 | 1.93 | 1.23** |
| Coolanol 25 | Organosilicate ester >90% KV100 1.6cSt | 0.895 | 2.05 | 3.58 | 1.94 | 1.23** |
| Fluorinert™ FC-40 | Perfluoro compounds C5-18 KV25 2.2cSt | 1.823 | 1.08 | 2.73 | 1.06 | 0.67 |
| Novec™ 7500 | 3-ethoxy-1,1,1,2,3,4,4,5,5,6,6,6-dodecafluoro-2- | 1.580 | 1.15 | 0.94 | 1.17 | 0.75 |

*Reference fluid.

**Heat transfer fluid of this disclosure.

Fig. 1 (Cont.)

Heat conveyance dominated, transition (Blasius) flow, centrifugal pump

| Product Name | Composition | $\rho$, 40C (g/ml) | $C_p$, 40C (J/g°C) | $\mu$, 40C (cP) | DEF = $\rho^{0.04} C_p^1 \mu^{-0.04}$ | NEF |
|---|---|---|---|---|---|---|
| Dowtherm® A | Biphenyl 26.5% + diphenyl oxide 73.5% | 1.044 | 1.63 | 2.56 | 1.57 | 1.00* |
| Esterex™ M11 | C16 paraffinic monoester | 0.848 | 2.240 | 2.670 | 2.14 | 1.36** |
| Esterex™ A32 | C8-C13 Branched chain dialkyl adipate esters | 0.911 | 2.160 | 8.203 | 1.98 | 1.26** |
| Exxate™ 900 | Acetate from C8-10 branched alcohol (C9 Rich) | 0.855 | 1.856 | 1.428 | 1.82 | 1.16** |
| SpectraSyn™ 2C | Polyalpha olefin | 0.786 | 2.409 | 5.309 | 2.23 | 1.42** |

*Reference fluid.

**Heat transfer fluid of this disclosure.

Fig. 1 (Cont.)

Heat conveyance dominated, laminar flow, positive displacement pump

| Product Name | Composition | $\rho$, 80C (g/ml) | $C_p$, 80C (J/g°C) | $\mu$, 80C (cP) | $DEF = \rho^1 C_p^1 \mu^{-1}$ | NEF |
|---|---|---|---|---|---|---|
| Dowtherm® A | Biphenyl 26.5% + diphenyl oxide 73.5% | 1.012 | 1.74 | 1.25 | 1.41 | 1.00* |
| Duratherm S | Siloxane >95% KV100 16.6cSt | 0.913 | 1.79 | 19.78 | 0.08 | 0.06 |
| Coolanol 20 | Organosilicate ester >90% KV100 0.93cSt | 0.850 | 2.11 | 0.95 | 1.88 | 1.34** |
| Coolanol 25 | Organosilicate ester >90% KV100 1.6cSt | 0.863 | 2.20 | 1.76 | 1.07 | 0.76 |
| Fluorinert™ FC-40 | Perfluoro compounds C5-18 KV25 2.2cSt | 1.736 | 1.14 | 1.23 | 1.60 | 1.14** |
| Novec™ 7500 | 3-ethoxy-1,1,1,2,3,4,4,5,5,6,6,6-dodecafluoro-2-trifluoromethyl-hexane >99% | 1.500 | 1.21 | 0.54 | 3.36 | 2.38** |

*Reference fluid.

**Heat transfer fluid of this disclosure.

Fig. 2

Heat conveyance dominated, laminar flow, positive displacement pump

| Product Name | Composition | $\rho$, 80C (g/ml) | $C_p$, 80C (J/g°C) | $\mu$, 80C (cP) | $DEF = \rho^1 C_p^1 \mu^{-1}$ | NEF |
|---|---|---|---|---|---|---|
| Dowtherm® A | Biphenyl 26.5% + diphenyl oxide 73.5% | 1.012 | 1.74 | 1.25 | 1.41 | 1* |
| Esterex™ M11 | C16 paraffinic monoester | 0.818 | 2.350 | 1.333 | 1.44 | 1.02** |
| Esterex™ A32 | C8-C13 Branched chain dialkyl adipate esters | 0.881 | 2.260 | 3.269 | 0.61 | 0.43 |
| Exxate™ 900 | Acetate from C8-10 branched alcohol (C9 Rich) | 0.822 | 1.941 | 0.775 | 2.06 | 1.46** |
| SpectraSyn™ 2C | Polyalpha olefin | 0.760 | 2.528 | 2.156 | 0.89 | 0.63 |

*Reference fluid.

**Heat transfer fluid of this disclosure.

Fig. 2 (Cont.)

Heat conveyance dominated, transition (Blasius) flow, positive displacement pump

| Product Name | Composition | $\rho$, 80C (g/ml) | $C_p$, 80C (J/g°C) | $\mu$, 80C (cP) | DEF = $\rho^{0.25} C_p^{1} \mu^{-0.25}$ | NEF |
|---|---|---|---|---|---|---|
| Dowtherm® A | Biphenyl 26.5% + diphenyl oxide 73.5% | 1.012 | 1.74 | 1.25 | 1.65 | 1.00* |
| Duratherm S | Siloxane >95% KV100 16.6cSt | 0.913 | 1.79 | 19.78 | 0.83 | 0.50 |
| Coolanol 20 | Organosilicate ester >90% KV100 0.93cSt | 0.850 | 2.11 | 0.95 | 2.05 | 1.24** |
| Coolanol 25 | Organosilicate ester >90% KV100 1.6cSt | 0.863 | 2.20 | 1.76 | 1.84 | 1.11** |
| Fluorinert™ FC-40 | Perfluoro compounds C5-18 KV25 2.2cSt | 1.736 | 1.14 | 1.23 | 1.24 | 0.75 |
| Novec™ 7500 | 3-ethoxy-1,1,1,2,3,4,4,5,5,6,6,6-dodecafluoro-2-trifluoromethyl-hexane >99% | 1.500 | 1.21 | 0.54 | 1.56 | 0.94 |

*Reference fluid.

**Heat transfer fluid of this disclosure.

Fig. 2 (Cont.)

Heat conveyance dominated, transition (Blasius) flow, positive displacement pump

| Product Name | Composition | $\rho$, 80C (g/ml) | $C_p$, 80C (J/g°C) | $\mu$, 80C (cP) | DEF = $\rho^{0.25} C_p^{1} \mu^{-0.25}$ | NEF |
|---|---|---|---|---|---|---|
| Dowtherm® A | Biphenyl 26.5% + diphenyl oxide 73.5% | 1.012 | 1.74 | 1.25 | 1.65 | 1* |
| Esterex™ M11 | C16 paraffinic monoester | 0.818 | 2.350 | 1.333 | 2.08 | 1.26** |
| Esterex™ A32 | C8-C13 Branched chain dialkyl adipate esters | 0.881 | 2.260 | 3.269 | 1.63 | 0.98 |
| Exxate™ 900 | Acetate from C8-10 branched alcohol (C9 Rich) | 0.822 | 1.941 | 0.775 | 1.97 | 1.19** |
| SpectraSyn™ 2C | Polyalpha olefin | 0.760 | 2.528 | 2.156 | 1.95 | 1.18** |

*Reference fluid.

**Heat transfer fluid of this disclosure.

Fig. 2 (Cont.)

Heat conveyance dominated, laminar flow, centrifugal pump

| Product Name | Composition | $\rho$, 80C (g/ml) | $C_p$, 80C (J/g°C) | $\mu$, 80C (cP) | DEF = $\rho^{0.19} C_p^{1} \mu^{-0.19}$ | NEF |
|---|---|---|---|---|---|---|
| Dowtherm® A | Biphenyl 26.5% + diphenyl oxide 73.5% | 1.012 | 1.74 | 1.25 | 1.68 | 1.00* |
| Duratherm S | Siloxane >95% KV100 16.6cSt | 0.913 | 1.79 | 19.78 | 1.00 | 0.60 |
| Coolanol 20 | Organosilicate ester >90% KV100 0.93cSt | 0.850 | 2.11 | 0.95 | 2.07 | 1.23** |
| Coolanol 25 | Organosilicate ester >90% KV100 1.6cSt | 0.863 | 2.20 | 1.76 | 1.92 | 1.14** |
| Fluorinert™ FC-40 | Perfluoro compounds C5-18 KV25 2.2cSt | 1.736 | 1.14 | 1.23 | 1.21 | 0.73 |
| Novec™ 7500 | 3-ethoxy-1,1,1,2,3,4,4,5,5,6,6,6-dodecafluoro-2-trifluoromethyl-hexane >99% | 1.500 | 1.21 | 0.54 | 1.47 | 0.88 |

*Reference fluid.

**Heat transfer fluid of this disclosure.

Fig. 2 (Cont.)

Heat conveyance dominated, laminar flow, centrifugal pump

| Product Name | Composition | $\rho$, 80C (g/ml) | $C_p$, 80C (J/g°C) | $\mu$, 80C (cP) | $DEF = \rho^{0.19} C_p^1 \mu_{0.19}^{-}$ | NEF |
|---|---|---|---|---|---|---|
| Dowtherm® A | Biphenyl 26.5% + diphenyl oxide 73.5% | 1.012 | 1.74 | 1.25 | 1.68 | 1* |
| Esterex™ M11 | C16 paraffinic monoester | 0.818 | 2.350 | 1.333 | 2.14 | 1.28** |
| Esterex™ A32 | C8-C13 Branched chain dialkyl adipate esters | 0.881 | 2.260 | 3.269 | 1.76 | 1.05** |
| Exxate™ 900 | Acetate from C8-10 branched alcohol (C9 Rich) | 0.822 | 1.941 | 0.775 | 1.96 | 1.17** |
| SpectraSyn™ 2C | Polyalpha olefin | 0.760 | 2.528 | 2.156 | 2.07 | 1.24** |

*Reference fluid.

**Heat transfer fluid of this disclosure.

Fig. 2 (Cont.)

Heat conveyance dominated, transition (Blasius) flow, centrifugal pump

| Product Name | Composition | $\rho$, 80C (g/ml) | $C_p$, 80C (J/g°C) | $\mu$, 80C (cP) | DEF = $\rho^{0.04} C_p^{1} \mu^{-0.04}$ | NEF |
|---|---|---|---|---|---|---|
| Dowtherm® A | Biphenyl 26.5% + diphenyl oxide 73.5% | 1.012 | 1.74 | 1.25 | 1.73 | 1.00* |
| Duratherm S | Siloxane >95% KV100 16.6cSt | 0.913 | 1.79 | 19.78 | 1.59 | 0.92 |
| Coolanol 20 | Organosilicate ester >90% KV100 0.93cSt | 0.850 | 2.11 | 0.95 | 2.10 | 1.22** |
| Coolanol 25 | Organosilicate ester >90% KV100 1.6cSt | 0.863 | 2.20 | 1.76 | 2.13 | 1.23** |
| Fluorinert™ FC-40 | Perfluoro compounds C5-18 KV25 2.2cSt | 1.736 | 1.14 | 1.23 | 1.15 | 0.67 |
| Novec™ 7500 | 3-ethoxy-1,1,1,2,3,4,4,5,5,6,6,6-dodecafluoro-2-trifluoromethyl-hexane >99% | 1.500 | 1.21 | 0.54 | 1.26 | 0.73 |

*Reference fluid.

**Heat transfer fluid of this disclosure.

Fig. 2 (Cont.)

Heat conveyance dominated, transition (Blasius) flow, centrifugal pump

| Product Name | Composition | $\rho$, 80C (g/ml) | $C_p$, 80C (J/g°C) | $\mu$, 80C (cP) | DEF = $\rho^{0.04} C_p^{\ 1} \mu^{-0.04}$ | NEF |
|---|---|---|---|---|---|---|
| Dowtherm® A | Biphenyl 26.5% + diphenyl oxide 73.5% | 1.012 | 1.74 | 1.25 | 1.73 | 1* |
| Esterex™ M11 | C16 paraffinic monoester | 0.818 | 2.350 | 1.333 | 2.30 | 1.33** |
| Esterex™ A32 | C8-C13 Branched chain dialkyl adipate esters | 0.881 | 2.260 | 3.269 | 2.14 | 1.24** |
| Exxate™ 900 | Acetate from C8-10 branched alcohol (C9 Rich) | 0.822 | 1.941 | 0.775 | 1.95 | 1.12** |
| SpectraSyn™ 2C | Polyalpha olefin | 0.760 | 2.528 | 2.156 | 2.42 | 1.40** |

*Reference fluid.
**Heat transfer fluid of this disclosure.

Fig. 2 (Cont.)

HEAT TRANSFER FLUIDS AND METHODS OF USE

CROSS-REFERENCE OF RELATED APPLICATIONS

This application is a continuation application filed under 37 C.F.R. 1.53(b) of parent U.S. application Ser. No. 16/447,398 filed on Jun. 20, 2019, the entirety of which is hereby incorporated herein by reference, which claims priority to U.S. Provisional Application No. 62/863,385 filed Jun. 19, 2019, the entire contents of which are incorporated herein by reference.

FIELD OF THE INVENTION

This disclosure provides heat transfer fluids for use in electrical apparatuses, in particular, electric vehicles, batteries, server banks, and data centers. This disclosure also provides a method for improving performance of an electrical apparatus heat transfer system, a method for improving performance of an electrical apparatus, and a method for selecting a heat transfer fluid for use in an electrical apparatus heat transfer system. The heat transfer fluids and methods of this disclosure are applicable in situations where the heat transfer system is dominated by heat conveyance.

BACKGROUND

A major challenge in cooling electric vehicles as well as mechanical and electrical systems, subsystems and components for electric vehicles, is formulating fluids with satisfactory heat transfer performance in specific devices. In particular, the challenge in heat transfer fluids is formulating fluids with satisfactory heat transfer performance in specific devices, and also having compatibility with electric vehicle components and materials.

The removal of heat from electric vehicle components such as batteries and electric motors during electric vehicle operation is commonly done using aqueous heat transfer fluids, which indirectly remove heat from the hot surfaces. As electric vehicle technology evolves to comprehend longer battery ranges, shorter recharging times, and higher vehicle power, there will be benefits associated with direct cooling of hot components, which is not possible with aqueous heat transfer fluids.

For example, direct cooling is significantly more efficient in emergency situations like run away reactions inside battery cells. The faster heat removal allows for improved thermal management where battery cells will not reach critical temperatures that can lead to irreversible battery fires. Indirectly cooled systems (e.g., water/glycol) are limited by the thermal conductivity of the jacket. Fast heat removal is a major benefit of a directly cooled system. Fast heat removal is also needed, for example, during super fast charging of lithium ion batteries.

In many electric vehicle applications, the performance of a heat transfer fluid is governed both by its ability to remove heat from hot surfaces and by the amount of power required to circulate the heat transfer fluid. An ideally-suited heat transfer fluid will maximize heat removal and require minimum power to circulate the fluid.

A Mouromtseff equation is used in the art for comparing the impact of heat transfer fluid properties on the resulting heat transfer coefficient. The Mouromtseff equation for turbulent flow systems is defined as follows: $k^{0.67} * \rho^{0.8} * c_p^{0.33} * \mu^{-0.47}$; and for laminar flow systems is defined as follows: V. While the use of the Mouromtseff equation provides a convenient method for quickly comparing heat transfer fluids, its use has a number of short comings. For example, use of the Mouromtseff equation implies that heat transfer in the physical situation in which the fluid is to be used is limited by heat transfer. In some situations (for example, if large heat transfer areas exist at the element to be cooled and the heat rejection site), heat conveyance by the circulating fluid may dominate. In such a situation, the actual mechanism of local heat transfer, and therefore fluid property impacts on that heat transfer, become significantly diminished. In these applications, while the Mouromtseff equation may be indicating something about the fluid, what it is indicating is significantly less relevant to its heat transfer performance.

Despite advances in heat transfer fluid formulation technology in electric vehicles, there exists a need for formulating fluids with satisfactory heat transfer performance in specific devices. Also, there is a need for heat transfer fluid formulations having compatibility with specific device components and materials. Further, there exists a need for heat transfer fluids that can maximize heat removal and require minimum power to circulate. Still further, an improved method for quickly and conveniently comparing heat transfer fluids and heat transfer that addresses operating variables, in addition to heat transfer fluid properties, in heat conveyance dominated situations, is needed.

SUMMARY

This disclosure relates to formulating fluids with satisfactory heat transfer performance in specific devices, e.g., electric vehicles, electric motors, batteries, electronics, computers, server banks, and data centers. The heat transfer fluid formulations of this disclosure have compatibility with specific device components and materials. The heat transfer fluid formulations maximize heat removal and require minimum power to circulate in specific device heat transfer systems. This disclosure relates to a method for quantitatively comparing heat transfer fluids and heat transfer that addresses operating variables such as circulation system flow regimes and types of pumps, in addition to heat transfer fluid properties, in heat conveyance dominated situations.

This disclosure also relates in part to a method for improving performance of a heat transfer system. The method comprises: (i) providing an apparatus having a heat transfer system, the heat transfer system comprising a heat transfer circuit, where the heat transfer circuit comprises: a pump, a conduit, and a heat exchanger; wherein the pump is at least one pump selected from a positive displacement pump and a centrifugal pump; (ii) circulating at least one non-aqueous dielectric heat transfer fluid through the heat transfer circuit to transfer heat with the apparatus, the non-aqueous dielectric heat transfer fluid having density ($\rho$), specific heat ($c_p$), and dynamic viscosity ($\mu$) properties; wherein the heat transfer fluid circulating through the heat transfer circuit has a heat transfer circuit dominant flow regime selected from laminar flow and transition flow; wherein the heat transfer system is heat conveyance dominated; and (iii) determining a normalized effectiveness factor ($NEF_{fluid}$) of the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime; wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime; wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
| --- | --- | --- |
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | whereby performance of the heat transfer system during operation is improved using a heat transfer fluid having a $NEF_{fluid}$ value equal to or greater than 1.0.

This disclosure further relates in part to a method for improving performance of an apparatus. The method comprises: (i) providing an apparatus having a heat transfer system the heat transfer system comprising a heat transfer circuit, where the heat transfer circuit comprises: a pump, a conduit, and a heat exchanger; wherein the pump is at least one pump selected from a positive displacement pump and a centrifugal pump; (ii) circulating at least one non-aqueous dielectric heat transfer fluid through the heat transfer circuit to transfer heat with the apparatus, the non-aqueous dielectric heat transfer fluid having density ($\rho$), specific heat ($c_p$), and dynamic viscosity ($\mu$) properties; wherein the heat transfer fluid circulating through the heat transfer circuit has a heat transfer circuit dominant flow regime selected from laminar flow and transition flow; wherein the heat transfer system is heat conveyance dominated; and (iii) determining a normalized effectiveness factor ($NEF_{fluid}$) of the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime; wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime; wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
| --- | --- | --- |
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | whereby performance of the apparatus during operation is improved using a heat transfer fluid having a $NEF_{fluid}$ value equal to or greater than 1.0.

This disclosure yet further relates in part to a method for selecting a heat transfer fluid for use in a heat transfer system. The method comprises: (i) providing an apparatus having a heat transfer system, the heat transfer system comprising a heat transfer circuit, where the heat transfer circuit comprises: a pump, a conduit, and a heat exchanger; (ii) circulating at least one non-aqueous dielectric heat transfer fluid through the heat transfer circuit to transfer heat with the apparatus, the non-aqueous dielectric heat transfer fluid having density ($\rho$), specific heat ($c_p$), and dynamic viscosity ($\mu$) properties; (iii) selecting a type of pump used in the heat transfer circuit, wherein the pump is at least one pump selected from a positive displacement pump and a centrifugal pump; (iv) selecting a heat transfer circuit dominant flow regime used to circulate the heat transfer fluid through the heat transfer circuit; wherein the heat transfer circuit dominant flow regime is selected from laminar flow and transition flow; (v) conducting the apparatus heat transfer system such that it is heat conveyance dominated; (vi) determining a normalized effectiveness factor ($NEF_{fluid}$) for the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for the selected pump and the selected heat transfer circuit dominant flow regime; wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime; wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
| --- | --- | --- |
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ |

(vii) selecting the heat transfer fluid for use in the heat transfer system if the $NEF_{fluid}$ for the heat transfer fluid is a value equal to or greater than 1.0.

This disclosure also relates in part to a heat transfer fluid for use in a heat transfer system. The heat transfer fluid comprises: at least one non-aqueous dielectric heat transfer fluid, the non-aqueous dielectric heat transfer fluid having density ($\rho$), specific heat ($c_p$), and dynamic viscosity ($\mu$) properties; wherein the heat transfer system comprises an apparatus and a heat transfer circuit, where the heat transfer circuit comprises: a pump, a conduit, and a heat exchanger; wherein the pump is at least one pump selected from a positive displacement pump and a centrifugal pump; wherein the heat transfer fluid circulating through the heat transfer circuit has a heat transfer circuit dominant flow regime selected from laminar flow and transition flow; wherein the heat transfer system is heat conveyance dominated; and wherein the heat transfer fluid has a normalized effectiveness factor ($NEF_{fluid}$) as determined by the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime; wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime; wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| | Selected Heat Transfer Circuit Flow Regime | |
|---|---|---|
| Selected Pump | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0.

It has been surprisingly found that the effectiveness of a heat transfer fluid is highly dependent on the design of the apparatus to be heat managed, and in some cases, certain properties of the heat transfer fluid are irrelevant. In other cases, the heat transfer fluid properties are relevant but to various extents, as reflected by various exponents in the DEF equations above. Also, it has been surprisingly found, in accordance with this disclosure, how heat flow and power to circulate the heat transfer fluid, and as a result the fluid's effectiveness in an apparatus application, are impacted by heat transfer fluid properties. A unique combination of heat transfer fluid properties has been identified that maximize effectiveness for the apparatus designs taking into account operating variables such as circulation system flow regimes and types of pumps, and also situations where heat conveyance dominates, as described herein. This unique combination of fluid properties, which is referred to as the normalized effectiveness factor ($NEF_{fluid}$) of the heat transfer fluid, has been found to differ from the combination of fluid properties proposed in the industry as generally applying with respect to heat transfer with liquid coolants, known as the Mouromtseff equation. As a result, for fluids with properties yielding higher normalized effectiveness factor ($NEF_{fluid}$) values than comparative materials with lower normalized effectiveness factor ($NEF_{fluid}$) values, the overall performance of the heat transfer system can be optimized.

In particular, it has been surprisingly found that, in accordance with this disclosure, improvement in performance of a heat transfer system is obtained by using a heat transfer fluid having a normalized effectiveness factor ($NEF_{fluid}$) equal to or greater than 1.

Other objects and advantages of the present disclosure will become apparent from the detailed description that follows.

BRIEF DESCRIPTION OF THE DRAWINGS

FIG. 1 shows formulations and properties, dimensional effectiveness factor ($DEF_{fluid}$) values, and normalized effectiveness factor ($NEF_{fluid}$) values, for reference fluids and heat transfer fluids at a temperature of 40° C., where heat conveyance is the dominant mechanism controlling performance of the reference fluid and heat transfer fluid in an application.

FIG. 2 shows formulations and properties, dimensional effectiveness factor ($DEF_{fluid}$) values, and normalized effectiveness factor ($NEF_{fluid}$) values, for reference fluids and heat transfer fluids at a temperature of 80° C., where heat conveyance is the dominant mechanism controlling performance of the reference fluid and heat transfer fluid in an application.

DETAILED DESCRIPTION

Definitions

Figure 3:
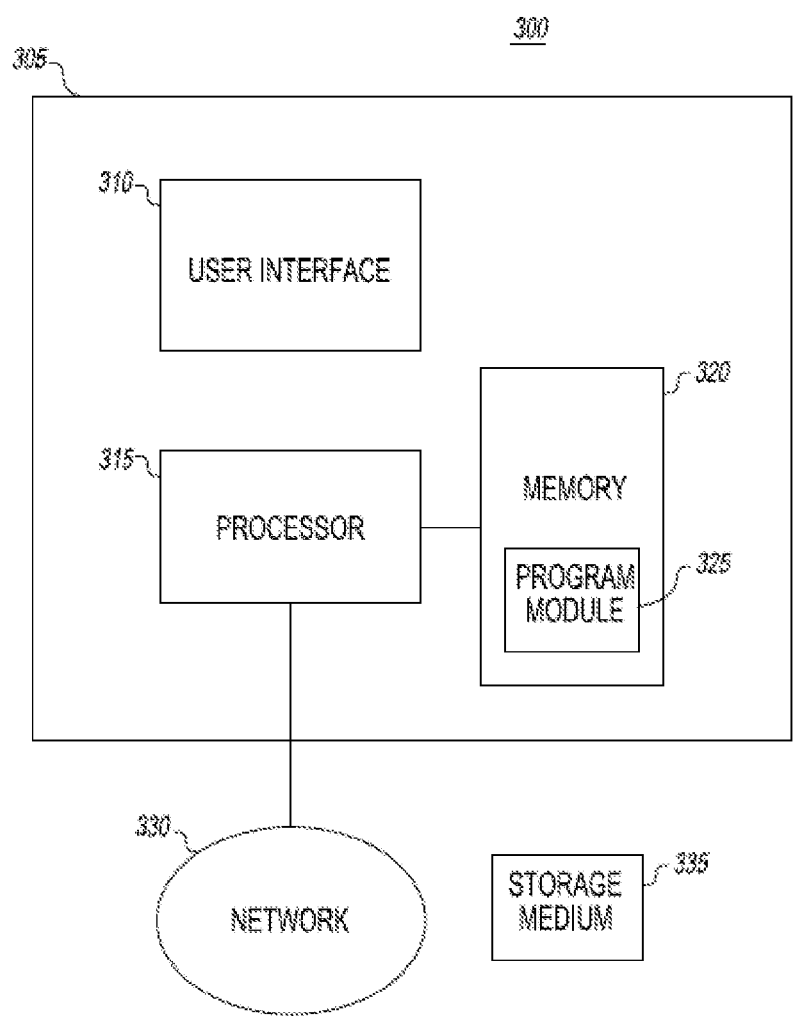
FIG. 3 is a block diagram of a computer related system for use in determining dimensional effectiveness factor ($DEF_{fluid}$) values and normalized effectiveness factor ($NEF_{fluid}$) values, in accordance with this disclosure.

"About" or "approximately". All numerical values within the detailed description and the claims herein are modified by "about" or "approximately" the indicated value, and take into account experimental error and variations that would be expected by a person having ordinary skill in the art.

"Major amount" as it relates to components included within the heat transfer fluids of the specification and the claims means greater than or equal to 50 wt. %, or greater than or equal to 60 wt. %, or greater than or equal to 70 wt. %, or greater than or equal to 80 wt. %, or greater than or equal to 90 wt. %, based on the total weight of the heat transfer fluid.

"Minor amount" as it relates to components included within the heat transfer fluids of the specification and the claims means less than 50 wt. %, or less than or equal to 40 wt. %, or less than or equal to 30 wt. %, or greater than or equal to 20 wt. %, or less than or equal to 10 wt. %, or less than or equal to 5 wt. %, or less than or equal to 2 wt. %, or less than or equal to 1 wt. %, based on the total weight of the heat transfer fluid.

"Essentially free" as it relates to components included within the heat transfer fluids of the specification and the claims means that the particular component is at 0 weight % within the heat transfer fluid, or alternatively is at impurity type levels within the heat transfer fluid (less than 100 ppm, or less than 20 ppm, or less than 10 ppm, or less than 1 ppm).

All percentages in describing heat transfer fluids herein are by weight unless specified otherwise. "Wt. %" means percent by weight.

"Electric vehicle(s)" refer to in this disclosure as all-electric and fully electric vehicles, and hybrid and hybrid electric vehicles, and includes the mechanical and electrical systems, subsystems, and components having gears used in the vehicles. These mechanical and electrical systems, subsystems and components having gears can include, for example, electrical vehicle powertrains, powertrain components, drivetrain components, kinetic energy recovery systems (KERS), energy regenerative systems, and the like. The terms electric vehicle and hybrid vehicle may be used interchangeably. In this disclosure, the phrase "electric vehicle" includes hybrid and hybrid electric vehicles, which may have any of a variety of parallel or series drivetrain configurations, alone or in combination.

It has now been found that the removal of heat from components such as batteries, on-board power electronics, super fast charging systems, and electric motors during electric vehicle operation can be done using non-aqueous heat transfer fluids, which directly removes heat from the hot surfaces. As electric vehicle technology evolves to comprehend longer battery ranges, shorter recharging times, and higher vehicle power, there will be benefits associated with direct cooling of hot components (including weight reduction do to engineering design changes, or due to the reduction of the mass contribution from the heat transfer fluid), which is not possible with aqueous heat transfer fluids. In addition, the use of non-aqueous dielectric coolants in accordance with this disclosure can reduce the possibility of safety issues associated with the electrical conductivity of water, including potential risk of hydrogen formation and release. Non-aqueous heat transfer fluids (e.g., hydrocarbon-based heat transfer fluids) can provide benefits in the evolving electric vehicle application with respect both to direct cooling of hot component surfaces and safety based on their low electrical conductivity.

In an electric vehicle application, the performance of a heat transfer fluid is governed both by its ability to remove heat from hot surfaces and by the amount of power required to circulate the heat transfer fluid. The heat transfer fluids of this disclosure maximize heat removal and require minimum power to circulate. Depending on the design of the electric vehicle, it has been found that the heat transfer fluid properties that govern its overall performance differ. For example, in an electric vehicle design where there is a very large surface area across which heat is to be removed from hot surfaces, and a very large surface area across which heat in turn removed from the heat transfer fluid to lower its temperature before recirculation, the heat capacity of the heat transfer fluid will dominate in determining the amount of heat flow from the hot components to the heat transfer fluid. In other electric vehicle designs, heat transfer fluid properties such as viscosity, density, and thermal conductivity also play key roles in determining the heat flow. In each case, the properties of the heat transfer fluid have been found to be important in determining the amount of power required to circulate the heat transfer fluid.

The overall effectiveness of a heat transfer fluid in a given electric vehicle design can be defined as the ratio of heat flow to the power to circulate the heat transfer fluid.

It has been found that an electric vehicle heat transfer fluid with a higher effectiveness will be able to remove more heat from hot surfaces per amount of power required to circulate the fluid. This will enable significant benefits in terms of maximizing electric vehicle battery range and/or optimizing the design of the heat transfer system in the vehicle. By evaluating the electric vehicle design parameters, it has been determined how heat flow and power to circulate the heat transfer fluid, and as a result the fluid's effectiveness in this electric vehicle application, are impacted by heat transfer fluid properties. A unique combination of fluid properties has been identified that maximize effectiveness for the electric vehicle designs described herein.

In an embodiment, a larger electric device may be made up of several smaller devices that perform according to different regimes. Different heat transfer fluids may be needed for the smaller devices that perform according to different regimes (e.g., batteries, front motors, rear motors, power management systems, electronics controlling a battery, on-board power electronics, super fast charging systems, fast charging equipment at charging stations, stationary super fast chargers, or on-board chargers). In accordance with this disclosure, methods for selecting particular heat transfer fluids for particular components are provided. In some cases, the selection of heat transfer fluids for different components can be contradictory, which means that in some instances involving a larger electrical device, multiple heat transfer fluids may be optimal or a trade-off may need to be made so that a single heat transfer fluid is selected as the best for the most power intensive component, and that same selected fluid is less optimal for other components, but the overall performance is more optimal than if an alternate fluid is selected.

In accordance with this disclosure, it has been found that this unique combination of fluid properties, which is referred to as the normalized effectiveness factor ($NEF_{fluid}$) of the heat transfer fluid, differs from the combination of fluid properties proposed in the industry as generally applying with respect to heat transfer with liquid coolants, known as the Mouromtseff equation, which is defined as follows for turbulent flow systems: $k^{0.67} * \rho^{0.8} * c_p^{0.33} * \mu^{-0.47}$; and for laminar flow systems is defined as follows: As a result, for heat transfer fluids with properties yielding higher normalized effectiveness factor ($NEF_{fluid}$) values than comparative materials with lower normalized effectiveness factor ($NEF_{fluid}$) values, the overall performance of a heat transfer system can be optimized.

The Mouromtseff equation referred to herein was developed as a quick and convenient method for comparing the impact of fluid properties on the resulting heat transfer coefficient. While the use of the Mouromtseff equation provides a convenient method for quickly comparing fluids, its use has a number of short comings, for example, with respect to flow rate, dimensionality, and dominant heat conveyance mechanism.

With respect to flow rate, in eliminating all of the variables from heat transfer correlations except those to do with fluid physical properties, the traditional Mouromtseff equation derivation ignores any impact that the fluid properties may have on the fluid circulation rate. In particular, if a centrifugal pump is being used, it is well known that the fluid properties could impact the circulation rate, and therefore the local fluid velocity. Thus a variable is typically eliminated, when it itself has dependence on the fluid properties. This dependency should be included in any fluid comparison.

With respect to dimensionality, in the use of the traditional Mouromtseff equation, the fluid property variables have units. This means that unlike the Nusselt (Nu), Reynolds (Re), and Prandtl (Pr) numbers, the resulting Mouromtseff equation is not dimensionless, however the appropriate units are frequently not reported in the literature. Therefore, any two different practitioners who calculate a Mouromtseff equation for the same fluid may produce different numbers, depending on, for example, if one uses Si units, and the other uses imperial units.

The Nusselt (Nu), Reynolds (Re), and Prandlt (Pr) numbers are defined as follows:

$$Nu\text{-Nusselt number}\left(Nu = \frac{hd}{k}\right)$$

$$Re\text{-Reynolds number}\left(Re = \frac{dvp}{\mu}\right)$$

$$Pr\text{-Prandlt number}\left(Pr = \frac{c_p\mu}{k}\right)$$

wherein $\mu_{Bulk}$ is average bulk fluid viscosity, $\mu_{Surface}$ is average surface fluid viscosity, h is fluid heat transfer coefficient, d is flow diameter, k is average fluid thermal conductivity, v is fluid velocity, μ is average fluid viscosity, and $c_p$ is average fluid heat capacity.

With respect to dominant heat transfer mechanism, use of the Mouromtseff equation implies that heat removal in the physical situation in which the fluid is to be used is dominated by localized heat transfer. In some situations (for example, if large heat transfer areas exist at the element to be cooled and the heat rejection site), heat conveyance by the circulating fluid may dominate. In such a situation, the actual mechanism of local heat transfer, and therefore fluid property impacts on that heat transfer, become irrelevant. In these applications, while the Mouromtseff equation may be indicating something about the fluid, what is indicating is irrelevant to the fluid performance as a heat transfer fluid.

Power is required to circulate the heat transfer fluid. For some heat transfer applications where this power is independently supplied, this may not be an issue. However particular in mobility applications, this power to circulate the fluid is often provided by the same power source that provides the power for the mobility. For example, in an electric vehicle, the battery provides the power for vehicle motion, and the power for circulating the heat transfer fluid. A similar situation occurs in aeronautical and aerospace applications. In such situations, when comparing fluids for heat transfer service, one needs to consider both how the fluid properties impact heat transfer, and how the fluid properties impact the power required to circulate the fluid.

The power required to circulate the fluid is simply the product of the fluid volumetric flowrate and the pressure drop through the circulating circuit. This does not include any inefficiencies of the specific pump performing this circulating power, and is assumed to be delivered by an ideal pump. The fluid properties impact on both the volumetric flowrate of the circulating fluid, and the pressure drop through the circuit will be dependent on what flow regime dominates pressure drop in that circuit. The presence of laminar, transitional, or turbulent lead to different relationships.

Equally, the specific type of pump being used to circulate the fluid will have an impact. For an ideal positive displacement pump, the volumetric flowrate will always be constant, regardless of fluid properties, but the resulting pressure drop will be impacted by properties. In that situation, the localized heat transfer dominance and heat conveyance dominance will both not change due to flowrate, but the pumping power will still vary for different fluids. On the contrary, if a constant pressure pump were to be used (i.e., a pump circulation system where the delivery pressure was constant, regardless of flowrate), the flowrate would change with physical properties, as would therefore the power required to circulate the fluid. For a centrifugal pump, both the delivered pressure and the volumetric flow could change with different fluids.

In accordance with this disclosure, a new effectiveness factor has been developed that considers both the fluid's performance as a heat transfer medium, and the power required to circulate the fluid. This factor will depend on the specific application, depending on whether heat transfer within the element to be cooled dominates or whether heat conveyance by the circulating fluid dominates (typically because of relatively large heat transfer areas, or low circulation rates are used). It is referred to as a dimensional effectiveness factor ($DEF_{fluid}$) because it will have the same deficiency as the Mouromtseff equation. It will have units, making its specific value dependent on the units used for the specific properties.

When heat conveyance is the dominant mode controlling performance of the heat transfer fluid in an application, the dimensional effectiveness factor ($DEF_{fluid}$) dependencies on fluid properties for the specified fluid circulation flow regimes and pump types are given in Table 1 herein. Table 1 gives dimensional effectiveness factor ($DEF_{fluid}$) equations for situations where heat conveyance is the dominant mechanism controlling performance of the heat transfer fluid in an application. In Table 1, the specifics of the heat transfer are not relevant, since they do not control the fluid's heat transfer performance. Thus, the fluid could be flowing through tubes, or over flat plates, or being sprayed as a jet, or any other fluid contact mechanism, and because the heat conveyance is dominant, the applicable dimensional effectiveness factor ($DEF_{fluid}$) equation from Table 1 would apply. Since the local heat transfer mechanism is not important, it can be seen that the fluid's thermal conductivity does not appear in Table 1 for any of the cases.

To overcome the issue of the dependence of the dimensional effectiveness factor ($DEF_{fluid}$) on the units system being used, a normalized effectiveness factor ($NEF_{fluid}$) is used in this disclosure. The normalized effectiveness factor ($NEF_{fluid}$) is given by:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 herein for a selected pump and a selected heat transfer circuit dominant flow regime; and wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime. Both $DEF_{fluid}$ and $DEF_{reference}$ are determined at the same predetermined temperature, and matching units for each property are used in each equation.

The predetermined temperature for determining $DEF_{fluid}$ and $DEF_{reference}$ can vary over a wide range. For example, the predetermined temperature can be between about −40° C. and about 175° C., or between about −25° C. and about 170° C., or between about −10° C. and about 165° C., or between about 0° C. and about 160° C., or between about 10° C. and about 155° C., or between about 25° C. and about 150° C., or between about 25° C. and about 125° C., or between about 30° C. and about 120° C., or between about 35° C. and about 115° C., or between about 35° C. and about 105° C., or between about 35° C. and about 95° C., or between about 35° C. and about 85° C. Preferred predetermined temperatures for determining $DEF_{fluid}$ and $DEF_{reference}$ include 40° C. or 80° C.

The properties of a reference fluid $DEF_{reference}$ are readily available in the literature, and provided consistent units are used for evaluation of the $DEF_{fluid}$ and $DEF_{reference}$, the $NEF_{fluid}$ will be dimensionless, thus eliminating one of the short comings of the $DEF_{fluid}$ and such measures as the Mouromtseff equation.

For any specific application, the appropriate density ($\rho$), specific heat ($c_p$), and dynamic viscosity ($\mu$) properties can be determined, then those properties can be used to calculate the $DEF_{fluid}$ and the $DEF_{reference}$, from which the $NEF_{fluid}$ can be determined.

The fluid properties that the normalized effectiveness factor ($NEF_{fluid}$) depends on are all temperature dependent. For purposes of this disclosure, the properties should be evaluated at the average temperature in the element to be cooled. For the use of the equations to define a fluid, a temperature of 40° C. or 80° C. can be used, however any other temperature can be used, provided that the same temperature is used for both the fluid being evaluated, and for the properties of the reference fluid.

In accordance with this disclosure, the normalized effectiveness factor ($NEF_{fluid}$) equation has a number of benefits, compared to the use of the Mouromtseff equation, for evaluating fluids for heat transfer applications.

The primary benefit of the normalized effectiveness factor ($NEF_{fluid}$) equation, compared to the use of the Mouromtseff equation, is the normalized effectiveness factor ($NEF_{fluid}$) equation's consideration of the power required to circulate the fluid when evaluating the fluid's potential heat transfer performance. The normalized effectiveness factor ($NEF_{fluid}$) equation can be thought of as providing a measure of the heat transfer potential per unit of fluid circulating energy. For applications where the power supply is shared between circulating the fluid and providing other uses, minimization of the power required for circulation will maximize the power available for other purposes. For example, if the application is an electric vehicle, having less power required for fluid circulation means that the range available from a fully charged battery increases. For a given application, this increased range would also lead to an increased battery life, as less charge cycling of the battery would be required. It is also appreciated that even when the power supply is not used to power other uses, there are still sufficient power stored.

Alternately, if utilized during the design process, a similar range could be produced using a smaller battery. Alternately, the vehicle designer could utilize the added power to provide additional powered features on the vehicle. Similarly, in an aeronautical application, the reduced circulating power could lead to improved fuel economy, an increase range, or additional features being installed on the aircraft. In an aerospace application, power is typically provided via solar collectors. This limitation on the available power places a greater emphasis on power management and use of the normalized effectiveness factor ($NEF_{fluid}$) equation provides a means of obtaining the maximum amount of heat transfer for the limited amount of available circulating power.

The traditional derivation of the Mouromtseff equation ignores the impact of fluid properties on the velocity during the simplification of the heat transfer correlations. While this is less important for applications where a positive displacement is used to circulate the fluid, it is important for other pump types. The normalized effectiveness factor ($NEF_{fluid}$) equation approach ensures that the fluid properties are fully encompassed in the analysis.

Historic use of the Mouromtseff equation leads to use of numbers which have units. Comparison of values with different units is not straight forward. Because the normalized effectiveness factor ($NEF_{fluid}$) equation is unitless, it provides a convenient means of comparison of values from different sources.

Use of the Mouromtseff equation approach to fluid evaluation implies that the local heat transfer process is the dominant mechanism which dictates the fluids heat transfer performance. This is not always the case. Fluid evaluation needs to be made based on an understanding of the dominant mechanism which dictates heat transfer performance. The normalized effectiveness factor ($NEF_{fluid}$) equation approach provides different options for different applications. This provides a more rigorous and correct method for fluid evaluation.

In an embodiment, performance of a heat transfer system during operation is improved using a heat transfer fluid having a normalized effectiveness factor ($NEF_{fluid}$) value equal to or greater than 1.0, or greater than 1.1, or greater than 1.2, or greater than 1.3, or greater than 1.4, or greater than 1.5, as compared to performance of a heat transfer system during operation using a heat transfer fluid having a normalized effectiveness factor ($NEF_{fluid}$) value of less than 1.0.

The heat transfer fluids of this disclosure possess properties (e.g., density ($\rho$), specific heat ($c_p$), and dynamic viscosity ($\mu$) properties) for imparting satisfactory heat transfer performance in specific devices. In addition, the heat transfer fluids of this disclosure can possess other properties that are beneficial for their use in specific devices. Such other properties include, for example, thermal conductivity (k) and flash point. In the heat transfer fluids of this disclosure, thermal conductivity (k) is not a significant contributor to the normalized effectiveness factor ($NEF_{fluid}$), nevertheless having a fluid with a higher thermal conductivity (k) can be a benefit because it increases the rate of heat transfer. Also, in the heat transfer fluids of this disclosure, flash point is not a significant contributor to the normalized effectiveness factor ($NEF_{fluid}$), nevertheless having a fluid with a higher flash point can be a benefit because it reduces flammability. Further, heat transfer fluids having properties that impart electrical compatibility, and compatibility with materials in specific devices, can be beneficial in specific devices.

As used herein, density ($\rho$) is determined in accordance with ASTM D8085 or D4052, specific heat ($c_p$) is determined by ASTM E1269, and dynamic viscosity ($\mu$) is determined by ASTM D8085 or derived from ASTM D445 and ASTM D4052.

In an embodiment, at a temperature of 40° C., the heat transfer fluids of this disclosure have a density ($\rho$) from about 0.25 g/mL to about 1.75 g/mL, or from about 0.30 g/mL to about 1.70 g/mL, or from about 0.35 g/mL to about 1.65 g/mL, or from about 0.40 g/mL to about 1.60 g/mL, or from about 0.45 g/mL to about 1.55 g/mL.

In another embodiment, at a temperature of 80° C., the heat transfer fluids of this disclosure have a density ($\rho$) from about 0.25 g/mL to about 1.75 g/mL, or from about 0.30 g/mL to about 1.70 g/mL, or from about 0.35 g/mL to about 1.65 g/mL, or from about 0.40 g/mL to about 1.60 g/mL, or from about 0.45 g/mL to about 1.55 g/mL.

In an embodiment, at a temperature of 40° C., the heat transfer fluids of this disclosure have a specific heat ($c_p$) from about 1.25 kJ/kg·K to about 3.50 kJ/kg·K, or from about 1.35 kJ/kg·K to about 3.40 kJ/kg·K, or from about 1.45 kJ/kg·K to about 3.25 kJ/kg·K, or from about 1.50 kJ/kg·K to about 3.20 kJ/kg·K, or from about 1.55 kJ/kg·K to about 3.15 kJ/kg·K.

In another embodiment, at a temperature of 80° C., the heat transfer fluids of this disclosure have a specific heat ($c_p$) from about 1.25 kl/kg·K to about 3.50 kJ/kg·K, or from about 1.35 kJ/kg·K to about 3.40 kl/kg·K, or from about 1.45 kl/kg·K to about 3.25 kJ/kg·K, or from about 1.50 kJ/kg·K to about 3.20 kJ/kg·K, or from about 1.55 kJ/kg·K to about 3.15 kJ/kg·K.

In an embodiment, where the average fluid temperature is 40° C., the heat transfer fluids of this disclosure have a dynamic viscosity ($\mu$) from about 0.50 centipoise (cP) to about 7.50 cP, or from about 0.55 cP to about 7.00 cP, or from about 0.65 cP to about 6.50 cP, or from about 0.70 cP to about 6.00 cP, or from about 0.75 cP to about 5.50 cP.

In another embodiment, where the average fluid temperature is 80° C., the heat transfer fluids of this disclosure have a dynamic viscosity ($\mu$) from about 0.50 cP to about 7.50 cP, or from about 0.55 cP to about 7.00 cP, or from about 0.65 cP to about 6.50 cP, or from about 0.70 cP to about 6.00 cP, or from about 0.75 cP to about 5.50 cP.

In accordance with this disclosure, when heat conveyance is the dominant mode controlling performance of the heat transfer fluid in an application, the dimensional effectiveness factor ($DEF_{fluid}$) equation dependencies on fluid properties for the specified fluid circulation flow regimes and pump types are as follows:

1) for positive displacement pump and laminar heat transfer circuit dominant flow regime, both the $DEF_{fluid}$ and the $DEF_{reference}$ are $\rho^1 c_p^1 \mu^{-1}$;

2) for positive displacement pump and transition heat transfer circuit dominant flow regime, both the $DEF_{fluid}$ and the $DEF_{reference}$ are $\rho^{0.25} c_p^1 \mu^{-0.25}$;

3) for centrifugal pump and laminar heat transfer circuit dominant flow regime, both the $DEF_{fluid}$ and the $DEF_{reference}$ are and $\rho^{0.19} c_p^1 \mu^{-0.19}$; and 4) for centrifugal pump and transition heat transfer circuit dominant flow regime, both the $DEF_{fluid}$ and the $DEF_{reference}$ are $\rho^{0.04} c_p^1 \mu^{-0.04}$.

Further, in accordance with this disclosure, when heat conveyance is the dominant mode controlling performance of the heat transfer fluid in an application, the dimensional effectiveness factor ($DEF_{fluid}$) equation dependencies on fluid properties for the specified fluid circulation flow regimes and pump types are as follows:

1) for positive displacement pump and laminar heat transfer circuit dominant flow regime, both the $DEF_{fluid}$ and the $DEF_{reference}$ are $\rho^{0.5-1.5} c_p^{0.5-1.5} \mu^{-1.5-0.5}$;

2) for positive displacement pump and transition heat transfer circuit dominant flow regime, both the $DEF_{fluid}$ and the $DEF_{reference}$ are $\rho^{0.1-0.5} c_p^{0.5-1.5} \mu^{-0.5-0.1}$;

3) for centrifugal pump and laminar heat transfer circuit dominant flow regime, both the $DEF_{fluid}$ and the $DEF_{reference}$ are $\rho^{0.05-0.5} c_p^{0.5-1.5} \mu^{-0.5-0.05}$; and 4) for centrifugal pump and transition heat transfer circuit dominant flow regime, both the $DEF_{fluid}$ and the $DEF_{reference}$ are $\rho^{0.01-0.1} c_p^{0.5-1.5} \mu^{-0.1-0.01}$.

As described herein, improvement in performance of a heat transfer system is obtained by using a heat transfer fluid having a normalized effectiveness factor ($NEF_{fluid}$) equal to or greater than 1, or greater than 1.1, or greater than 1.15, or greater than 1.2, or greater than 1.25, or greater than 1.3, or greater than 1.35, or greater than 1.4, or greater than 1.45, or greater than 1.5.

Illustrative reference fluids useful in this disclosure include, for example, conventional fluids known in the art such as biphenyl 26.5 wt %+diphenyl oxide 73.5 wt % (Dowtherm A), siloxane (>95%, KV100 16.6cSt) (Duratherm S), organosilicate ester (>90%, KV100 0.93cSt) (Coolanol 20), organosilicate ester (>90%, KV100 1.6cSt) (Coolanol 25R), perfluoro fluid C5-C8 (KV25 2.2cSt) (Fluorinert FC-40), 3-ethoxy-1,1,1,2,3,4,4,5,5,6,6,6-dodecafluoro-2-trifluoromethyl-hexane (>99%) (Novec 7500), and the like.

The heat transfer fluids of this disclosure provide sustained heat transfer fluid properties over the lifetime of the heat transfer fluid, and compatibility with apparatus, e.g., electric vehicle, components and materials. Illustrative electric vehicle components that can be cooled in accordance with this disclosure include, for example, electric vehicle batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super fast charging systems, fast charging equipment at charging stations, stationary super fast chargers, and the like.

Depending on the particular apparatus (e.g., electric vehicle batteries, electric motors, electric generators, AC-DC/DC-AC/AC-AC/DC-DC converters, AC-DC/DC-AC/AC-AC/DC-DC transformers, power management systems, electronics controlling batteries, on-board chargers, on-board power electronics, super fast charging systems, fast charging equipment at charging stations, stationary super fast chargers, and the like), the apparatus can operate over a wide temperature range. For example, the apparatus can operate at a temperature between about −40° C. and about 175° C., or between about −25° C. and about 170° C., or between about −10° C. and about 165° C., or between about 0° C. and about 160° C., or between about 10° C. and about 155° C., or between about 25° C. and about 150° C., or between about 25° C. and about 125° C., or between about 30° C. and about 120° C., or between about 35° C. and about 115° C., or between about 35° C. and about 105° C., or between about 35° C. and about 95° C., or between about 35° C. and about 85° C.

In an embodiment, a single heat transfer fluid can be used in the apparatus. In another embodiment, more than one heat transfer fluids can be used in the apparatus, for example, one heat transfer fluid for the battery and another heat transfer fluid for another component of the apparatus.

Further, the heat transfer fluids of this disclosure provide advantaged performance on surfaces of apparatus components that include, for example, the following: metals, metal alloys, non-metals, non-metal alloys, mixed carbon-metal composites and alloys, mixed carbon-nonmetal composites and alloys, ferrous metals, ferrous composites and alloys, non-ferrous metals, non-ferrous composites and alloys, titanium, titanium composites and alloys, aluminum, aluminum composites and alloys, magnesium, magnesium composites and alloys, ion-implanted metals and alloys, plasma modified surfaces; surface modified materials; coatings; monolayer, multi-layer, and gradient layered coatings; honed surfaces; polished surfaces; etched surfaces; textured surfaces; micro and nano structures on textured surfaces; superfinished surfaces; diamond-like carbon (DLC), DLC with high-hydrogen content, DLC with moderate hydrogen content, DLC with low-hydrogen content, DLC with near-zero hydrogen content, DLC composites, DLC-metal compositions and composites, DLC-nonmetal compositions and composites; ceramics, ceramic oxides, ceramic nitrides, FeN, CrN, ceramic carbides, mixed ceramic compositions, and the like; polymers, thermoplastic polymers, engineered polymers, polymer blends, polymer alloys, polymer composites; materials compositions and composites, that include, for example, graphite, carbon, molybdenum, molybdenum disulfide, polytetrafluoroethylene, polyperfluoropropylene, polyperfluoroalkylethers, and the like.

As used herein, the apparatus is not narrowly critical and can include, for example, an electric vehicle, a computer server farm, a charging station, a rechargeable battery system, and the like.

Over the years, researchers have developed many pressure drop correlations. As an example, one of the most widely utilized correlations for calculating the pressure drop due to laminar flow in a pipe is the Hagen-Poiseuille equation is commonly used for. The specific correlation to use will be dependent on the geometry and flow regime where the majority of pressure drop through the circuit occurs. For this disclosure, use was made of correlations for the "Fanning friction factor", f, which is defined as:

$$f = \frac{1}{4} \circ d \frac{\Delta P}{L} \frac{1}{\frac{1}{2}\rho v^2},$$

where:
f—Fanning friction factor,
d—tube/pipe diameter,
ΔP—pressure drop,
L—equivillent length of tube/pipe,
ρ—average fluid density, and
v—fluid velocity.

Correlations for the friction factor have been developed as a function of the Reynolds number as:

$$\left(Re \cdot = \cdot \frac{dv\rho}{\mu}\right).$$

Laminar flow is defined as when the Re<2,100. In this flow regime, the friction factor, f, is given by:

$$f = \frac{16}{Re}.$$

Transitional flow is defined as when the Re>2,100 and its friction factor can be described by the Blasius equation, listed below:

$$f = \frac{0.0791}{Re^{0.25}}.$$

Transition to fully turbulent flow depends on the roughness of the pipe. For smooth pipes, the Blasius equation above can be valid up to a Reynolds number of $10^7$. For specific applications, reference can be made to charts in references like R. B. Bird, W. E. Stewart and E. N. Lightfoot, "Transport Phenomena", John Wiley & Sons, New York, 1960, where based on the roughness of the specific application, deviation from the Blasius equation can be determined.

While these specific correlations have been used to derive the exponents on the properties in the factors for this disclosure, it should be noted that any specific pressure drop correlation could be used for any specific application. Equally, this approach could be used for any other application, like for example, flow over the outside of a tube bank, or, axial flow through concentric rotating cylinders, like for instance which may be encountered when directly cooling a rotor/stator.

Heat Transfer Fluid Base Stocks and Cobase Stocks

A wide range of heat transfer fluid base oils is known in the art. Heat transfer fluid base oils that are useful in the present disclosure are natural oils, mineral oils and synthetic oils, and unconventional oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one heat transfer fluid base oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for heat transfer fluid base oils. Group I base stocks have a viscosity index of between about 80 to 120 and contain greater than about 0.03% sulfur and/or less than about 90% saturates. Group II base stocks have a viscosity index of between about 80 to 120, and contain less than or equal to about 0.03% sulfur and greater than or equal to about 90% saturates. Group III stocks have a viscosity index greater than about 120 and contain less than or equal to about 0.03% sulfur and greater than about 90% saturates. Group IV includes polyalphaolefins (PAO). Group V base stock includes base stocks not included in Groups I-IV. The Table 2 below summarizes properties of each of these five groups.

TABLE 2

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | | polyalphaolefins (PAO) | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted.

Group II and/or Group III hydroprocessed or hydrocracked base stocks, including synthetic oils such as alkyl aromatics and synthetic esters are also well known base stock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, $C_{14}$ olefins or mixtures thereof may be utilized. See U.S. Pat. Nos. 4,956,122; 4,827,064; and 4,827,073.

The number average molecular weights of the PAOs, which are known materials and generally available on a major commercial scale from suppliers such as ExxonMobil Chemical Company, Chevron Phillips Chemical Company, BP, and others, typically vary from about 250 to about 3,000, although PAO's may be made in viscosities up to about 350 cSt (100° C.). The PAOs are typically comprised of relatively low molecular weight hydrogenated polymers or oligomers of alphaolefins which include, but are not limited to, $C_2$ to about $C_{32}$ alphaolefins with the $C_8$ to about $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of $C_{14}$ to $C_{18}$ may be used to provide low viscosity base stocks of acceptably low volatility. Depending on the viscosity grade and the starting oligomer, the PAOs may be predominantly trimers and tetramers of the starting olefins, with minor amounts of the higher oligomers, having a viscosity range of 1.5 to 12 cSt. PAO fluids of particular use may include 3.0 cSt, 3.4 cSt, and/or 3.6 cSt and combinations thereof. Mixtures of PAO fluids having a viscosity range of 1.5 to approximately 350 cSt or more may be used if desired.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. For example the methods disclosed by U.S. Pat. No. 4,149,178 or U.S. Pat. No. 3,382,291 may be conveniently used herein. Other descriptions of PAO synthesis are found in the following U.S. Pat. Nos. 3,742,082; 3,769,363; 3,876,720; 4,239,930; 4,367,352; 4,413,156; 4,434,408; 4,910,355; 4,956,122; and 5,068,487. The dimers of the $C_{14}$ to $C_{18}$ olefins are described in U.S. Pat. No. 4,218,330.

Other useful heat transfer fluid oil base stocks include wax isomerate base stocks and base oils, comprising hydroisomerized waxy stocks (e.g. waxy stocks such as gas oils, slack waxes, fuels hydrocracker bottoms, etc.), hydroisomerized Fischer-Tropsch waxes, Gas-to-Liquids (GTL) base stocks and base oils, and other wax isomerate hydroisomerized base stocks and base oils, or mixtures thereof. Fischer-Tropsch waxes, the high boiling point residues of Fischer-Tropsch synthesis, are highly paraffinic hydrocarbons with very low sulfur content. The hydroprocessing used for the production of such base stocks may use an amorphous hydrocracking/hydroisomerization catalyst, such as one of the specialized lube hydrocracking (LHDC) catalysts or a crystalline hydrocracking/hydroisomerization catalyst, preferably a zeolitic catalyst. For example, one useful catalyst is ZSM-48 as described in U.S. Pat. No. 5,075,269, the disclosure of which is incorporated herein by reference in its entirety. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Each of the aforementioned patents is incorporated herein in their entirety. Particularly favorable processes are described in European Patent Application Nos. 464546 and 464547, also incorporated herein by reference. Processes using Fischer-Tropsch wax feeds are described in U.S. Pat. Nos. 4,594,172 and 4,943,672, the disclosures of which are incorporated herein by reference in their entirety.

Gas-to-Liquids (GTL) base oils, Fischer-Tropsch wax derived base oils, and other wax-derived hydroisomerized (wax isomerate) base oils be advantageously used in the instant disclosure, and may have useful kinematic viscosities at 100° C. of about 3 cSt to about 50 cSt, preferably about 3 cSt to about 30 cSt, more preferably about 3.5 cSt to about 25 cSt, as exemplified by GTL 4 with kinematic viscosity of about 4.0 cSt at 100° C. and a viscosity index of about 141. These Gas-to-Liquids (GTL) base oils, Fischer-Tropsch wax derived base oils, and other wax-derived hydroisomerized base oils may have useful pour points of about −20° C. or lower, and under some conditions may have advantageous pour points of about −25° C. or lower, with useful pour points of about −30° C. to about −40° C. or lower. Useful compositions of Gas-to-Liquids (GTL) base oils, Fischer-Tropsch wax derived base oils, and wax-derived hydroisomerized base oils are recited in U.S. Pat. Nos. 6,080,301; 6,090,989, and 6,165,949 for example, and are incorporated herein in their entirety by reference.

The hydrocarbyl aromatics can be used as a base oil or base oil component and can be any hydrocarbyl molecule that contains at least about 5% of its weight derived from an aromatic moiety such as a benzenoid moiety or naphthenoid moiety, or their derivatives. These hydrocarbyl aromatics include alkyl benzenes, alkyl naphthalenes, alkyl diphenyl oxides, alkyl naphthols, alkyl diphenyl sulfides, alkylated bis-phenol A, alkylated thiodiphenol, and the like. The aromatic can be mono-alkylated, dialkylated, polyalkylated, and the like. The aromatic can be mono- or poly-functionalized. The hydrocarbyl groups can also be comprised of mixtures of alkyl groups, alkenyl groups, alkynyl, cycloalkyl groups, cycloalkenyl groups and other related hydrocarbyl groups. The hydrocarbyl groups can range from about $C_6$ up to about $C_{60}$ with a range of about $C_8$ to about $C_{20}$ often being preferred. A mixture of hydrocarbyl groups is often preferred, and up to about three such substituents may be present. The hydrocarbyl group can optionally contain sulfur, oxygen, and/or nitrogen containing substituents. The aromatic group can also be derived from natural (petroleum) sources, provided at least about 5% of the molecule is comprised of an above-type aromatic moiety. Viscosities at 100° C. of approximately 3 cSt to about 50 cSt are preferred, with viscosities of approximately 3.4 cSt to about 20 cSt often being more preferred for the hydrocarbyl aromatic component. In one embodiment, an alkyl naphthalene where the alkyl group is primarily comprised of 1-hexadecene is used. Other alkylates of aromatics can be advantageously used. Naphthalene or methyl naphthalene, for example, can be alkylated with olefins such as octene, decene, dodecene, tetradecene or higher, mixtures of similar olefins, and the like. Useful concentrations of hydrocarbyl aromatic in a heat transfer fluid composition can be about 2% to about 25%, preferably about 4% to about 20%, and more preferably about 4% to about 15%, depending on the application.

Alkylated aromatics such as the hydrocarbyl aromatics of the present disclosure may be produced by well-known Friedel-Crafts alkylation of aromatic compounds. See Friedel-Crafts and Related Reactions, Olah, G. A. (ed.), Inter-science Publishers, New York, 1963. For example, an aromatic compound, such as benzene or naphthalene, is alkylated by an olefin, alkyl halide or alcohol in the presence of a Friedel-Crafts catalyst. See Friedel-Crafts and Related Reactions, Vol. 2, part 1, chapters 14, 17, and 18, See Olah, G. A. (ed.), Inter-science Publishers, New York, 1964. Many homogeneous or heterogeneous, solid catalysts are known to one skilled in the art. The choice of catalyst depends on the reactivity of the starting materials and product quality requirements. For example, strong acids such as $AlCl_3$, $BF_3$, or HF may be used. In some cases, milder catalysts such as $FeCl_3$ or $SnCl_4$ are preferred. Newer alkylation technology uses zeolites or solid super acids.

Esters comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those which are obtained by reacting one or more polyhydric alcohols, preferably the hindered polyols (such as the neopentyl polyols, e.g., neopentyl glycol, trimethylol ethane, 2-methyl-2-propyl-1,3-propanediol, trimethylol propane, pentaerythritol and dipentaerythritol) with alkanoic acids containing at least about 4 carbon atoms, preferably $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid, or mixtures of any of these materials.

Suitable synthetic ester components include the esters of trimethylol propane, trimethylol butane, trimethylol ethane, pentaerythritol and/or dipentaerythritol with one or more monocarboxylic acids containing from about 5 to about 10 carbon atoms. These esters are widely available commercially, for example, the Mobil P-41 and P-51 esters of ExxonMobil Chemical Company.

Also useful are esters derived from renewable material such as coconut, palm, rapeseed, soy, sunflower and the like. These esters may be monoesters, di-esters, polyol esters, complex esters, or mixtures thereof. These esters are widely available commercially, for example, the Mobil P-51 ester of ExxonMobil Chemical Company.

Heat transfer fluid formulations containing renewable esters are included in this disclosure. For such formulations, the renewable content of the ester is typically greater than about 70 weight percent, preferably more than about 80 weight percent and most preferably more than about 90 weight percent.

Other useful fluids include non-conventional or unconventional base stocks that have been processed, preferably catalytically, or synthesized to provide high performance heat transfer characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, preferably F-T material derived base stock(s) and/or base oil(s), are characterized typically as having kinematic viscosities at 100° C. of from about 2 $mm^2/s$ to about 50 $mm^2/s$ (ASTM D445). They are further characterized typically as having pour points of −5° C. to about −40° C. or lower (ASTM D97). They are also characterized typically as having viscosity indices of about 80 to about 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than about 10 ppm, and more typically less than about 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived is preferably an F-T material (i.e., hydrocarbons, waxy hydrocarbons, wax).

Base oils for use in the formulated heat transfer fluids useful in the present disclosure are any of the variety of oils corresponding to API Group I, Group II, Group III, Group IV, and Group V oils, and mixtures thereof, preferably API Group II, Group III, Group IV, and Group V oils, and mixtures thereof, more preferably Group III, Group IV, and Group V base oils, and mixtures thereof. Highly paraffinic base oils can be used to advantage in the formulated heat transfer fluids useful in the present disclosure. Minor quantities of Group I stock, such as the amount used to dilute additives for blending into formulated lube oil products, can also be used. Even in regard to the Group II stocks, it is preferred that the Group II stock be in the higher quality range associated with that stock, i.e. a Group II stock having a viscosity index in the range 100<VI<120.

Preferred base fluids for use in the formulated heat transfer fluids useful in the present disclosure include, for example, aromatic hydrocarbons, polyolefins, paraffins, isoparaffins, esters, ethers, fluorinated fluids, nano fluids, and silicone oils.

The base oil constitutes the major component of the heat transfer fluid composition of the present disclosure and typically is present in an amount ranging from about 50 to about 99 weight percent, preferably from about 70 to about 95 weight percent, and more preferably from about 85 to about 95 weight percent, based on the total weight of the composition. The base oil conveniently has a kinematic viscosity, according to ASTM standards, of about 2.5 cSt to about 12 cSt (or mm$^2$/s) at 100° C. and preferably of about 2.5 cSt to about 9 cSt (or mm$^2$/s) at 100° C. Mixtures of synthetic and natural base oils may be used if desired. Bi-modal mixtures of Group I, II, III, IV, and/or V base stocks may be used if desired.

Heat Transfer Fluid Additives

The formulated heat transfer fluid useful in the present disclosure may additionally contain one or more commonly used heat transfer fluid performance additives including but not limited to antioxidants, corrosion inhibitors, antifoam agents, nanomaterials, nanoparticles, and others. These additives are commonly delivered with varying amounts of diluent oil, that may range from 5 weight percent to 50 weight percent.

The additives useful in this disclosure do not have to be soluble in the heat transfer fluids.

The types and quantities of performance additives used in combination with the instant disclosure in heat transfer fluid compositions are not limited by the examples shown herein as illustrations.

Antioxidants

The heat transfer fluids typically include at least one antioxidant. Antioxidants retard the oxidative degradation of base oils during service. Such degradation may result in deposits on metal surfaces, the presence of sludge, or a viscosity increase in the heat transfer fluid. One skilled in the art knows a wide variety of oxidation inhibitors that are useful in heat transfer fluids. See, Klamann in Lubricants and Related Products, op cite, and U.S. Pat. Nos. 4,798,684 and 5,084,197, for example.

Illustrative antioxidants include sterically hindered alkyl phenols such as 2,6-di-tert-butylphenol, 2,6-di-tert-butyl-p-cresol and 2,6-di-tert-butyl-4-(2-octyl-3-propanoic) phenol; N,N-di(alkylphenyl) amines; and alkylated phenylenediamines The antioxidant may be a hindered phenolic antioxidant such as butylated hydroxytoluene, suitably present in an amount of 0.01 to 5%, preferably 0.4 to 0.8%, by weight of the heat transfer fluid. Alternatively, or in addition, the antioxidant may comprise an aromatic amine antioxidant such as mono-octylphenylalphanapthyl amine or p,p-dioctyldiphenylamine, used singly or in admixture. The amine antioxidant component is suitably present in a range of from 0.01 to 5% by weight of the heat transfer fluid, more preferably 0.5 to 1.5%.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_6$+ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl-phenolic proprionic ester derivatives. Bis-phenolic antioxidants may also be advantageously used in combination with the instant disclosure. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Other illustrative phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and Spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from 3-100 carbons, preferably 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

Generally, therefore, the phenolic antioxidant may be represented by the general formula:

$(R)_x—Ar—(OH)_y$, where Ar is selected from the group consisting of:

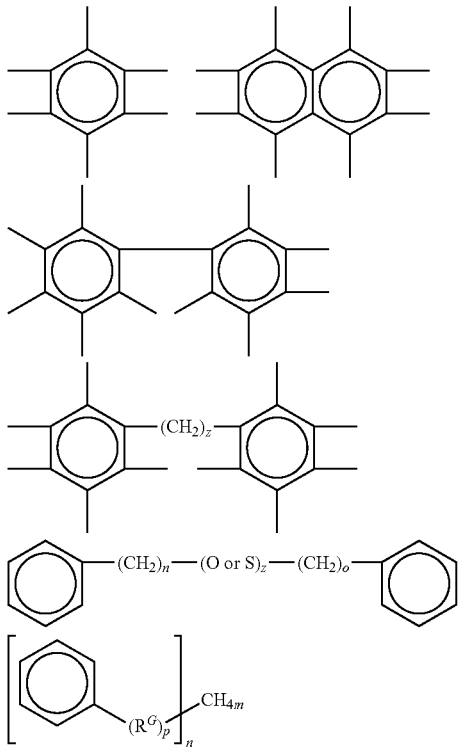

wherein R is a $C_3$-$C_{100}$ alkyl or alkenyl group, a sulfur substituted alkyl or alkenyl group, preferably a $C_4$-$C_{50}$ alkyl or alkenyl group or sulfur substituted alkyl or alkenyl group, more preferably $C_3$-$C_{100}$ alkyl or sulfur substituted alkyl group, most preferably a $C_4$-$C_{50}$ alkyl group, $R^g$ is a $C_1$-$C_{100}$ alkylene or sulfur substituted alkylene group, preferably a $C_2$-$C_{50}$ alkylene or sulfur substituted alkylene group, more preferably a $C_2$-$C_{20}$ alkylene or sulfur substituted alkylene group, y is at least 1 to up to the available valences of Ar, x ranges from 0 to up to the available valances of Ar-y, z ranges from 1 to 10, n ranges from 0 to 20, and m is 0 to 4 and p is 0 or 1, preferably y ranges from 1 to 3, x ranges from 0 to 3, z ranges from 1 to 4 and n ranges from 0 to 5, and p is 0.

Preferred phenolic antioxidant compounds are the hindered phenolics and phenolic esters which contain a sterically hindered hydroxyl group, and these include those derivatives of dihydroxy aryl compounds in which the hydroxyl groups are in the o- or p-position to each other. Typical phenolic antioxidants include the hindered phenols substituted with C.sub.1+ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4 alkoxy phenol; and

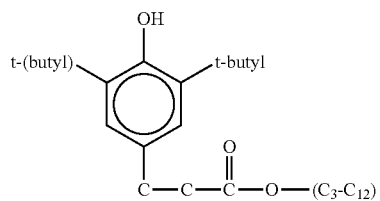

Phenolic type antioxidants are well known in the heat transfer fluid industry and commercial examples such as Ethanox™ 1710, Irganox™ 1076, Irganox™ L1035, Irganox™ 1010, Irganox™ L109, Irganox™ L118, Irganox™ L135 and the like are familiar to those skilled in the art. The above is presented only by way of exemplification, not limitation on the type of phenolic antioxidants which can be used.

Other examples of phenol-based antioxidants include 2-t-butylphenol, 2-t-butyl-4-methylphenol, 2-t-butyl-5-methylphenol, 2,4-di-t-butylphenol, 2,4-dimethyl-6-t-butylphenol, 2-t-butyl-4-methoxyphenol, 3-t-butyl-4-methoxyphenol, 2,5-di-t-butylhydroquinone (manufactured by the Kawaguchi Kagaku Co. under trade designation "Antage DBH"), 2,6-di-t-butylphenol and 2,6-di-t-butyl-4-alkylphenols such as 2,6-di-t-butyl-4-methylphenol and 2,6-di-t-butyl-4-ethylphenol; 2,6-di-t-butyl-4-alkoxyphenols such as 2,6-di-t-butyl-4-methoxyphenol and 2,6-di-t-butyl-4-ethoxyphenol, 3,5-di-t-butyl-4-hydroxybenzylmercaptoocty-1 acetate, alkyl-3-(3,5-di-t-butyl-4-hydroxyphenyl)propionates such as n-octyl-3-(3,5-di-t-butyl-4-hydroxyphenyl)propionate (manufactured by the Yoshitomi Seiyaku Co. under the trade designation "Yonox SS"), n-dodecyl-3-(3,5-di-t-butyl-4-hydroxyphenyl)propionate and 2'-ethylhexyl-3-(3,5-di-t-butyl-4-hydroxyphenyl)propionate; 2,6-di-t-butyl-alpha-dimethylamino-p-cresol, 2,2'-methylenebis(4-alkyl-6-t-butylphenol) compounds such as 2,2'-methylenebis(4-methyl-6-t-butylphenol) (manufactured by the Kawaguchi Kagaku Co. under the trade designation "Antage W-400") and 2,2'-methylenebis(4-ethyl-6-t-butylphenol) (manufactured by the Kawaguchi Kagaku Co. under the trade designation "Antage W-500"); bisphenols such as 4,4'-butylidenebis(3-methyl-6-t-butyl-phenol) (manufactured by the Kawaguchi Kagaku Co. under the trade designation "Antage W-300"), 4,4'-methylenebis(2,6-di-t-butylphenol) (manufactured by Laporte Performance Chemicals under the trade designation "Ionox 220AH"), 4,4'-bis(2,6-di-t-butylphenol), 2,2-(di-p-hydroxyphenyl) propane (Bisphenol A), 2,2-bis(3,5-di-t-butyl-4-hydroxyphenyl)propane, 4,4'-cyclohexylidenebis(2,6-di-t-butylphenol), hexamethylene glycol bis[3, (3,5-di-t-butyl-4-hydroxyphenyl)propionate] (manufactured by the Ciba Specialty Chemicals Co. under the trade designation "Irganox L109"), triethylene glycol bis[3-(3-t-butyl-4-hydroxy-y-5-methylphenyl)propionate] (manufactured by the Yoshitomi Seiyaku Co. under the trade designation "Tominox 917"), 2,2'-thio[diethyl-3-(3,5-di-t-butyl-4-hydroxyphenyl)propionate] (manufactured by the Ciba Speciality Chemicals Co. under the trade designation "Irganox L115"), 3,9-bis {1,1-dimethyl-2-[3-(3-t-butyl-4-hydroxy-5-methylphenyl)-propionyloxy]ethyl}2,4,8,10-tetraoxaspiro[5,5] undecane (manufactured by the Sumitomo Kagaku Co. under the trade designation "Sumilizer GA80") and 4,4'-thiobis(3-methyl-6-t-butylphenol) (manufactured by the Kawaguchi Kagaku Co. under the trade designation "Antage RC"), 2,2'-thiobis(4,6-di-t-butylresorcinol); polyphenols such as tetrakis[methylene-3-(3,5-di-t-butyl-4-hydroxyphenyl)propionato[methane (manufactured by the Ciba Speciality Chemicals Co. under the trade designation "Irganox L101"), 1,1,3-tris(2-methyl-4-hydroxy-5-t-butylphenyl)butane (manufactured by the Yoshitomi Seiyaku Co. under the trade designation "Yoshinox 930"), 1,3,5-trimethyl-2,4,6-tris(3,5-di-t-butyl-4-hydroxybenzyl)benzene (manufactured by Ciba Speciality Chemicals under the trade designation "Irganox 330"), bis[3,3'-bis(4'-hydroxy-3'-t-butylphenyl)butyric acid]glycol ester, 2-(3',5'-di-t-butyl-4-hydroxyphenyl)-methyl-4-(2'',4''-di-t-butyl-3''-hydroxyphenyl)methyl-6-t-butylphenol and 2,6-bis(2'-hydroxy-3'-t-butyl-5'-methylbenzyl)-4-methylphenol; and phenol/aldehyde condensates such as the condensates of p-t-butylphenol and formaldehyde and the condensates of p-t-butylphenol and acetaldehyde.

Effective amounts of one or more catalytic antioxidants may also be used. The catalytic antioxidants comprise an effective amount of a) one or more oil soluble polymetal organic compounds; and, effective amounts of b) one or more substituted N,N'-diaryl-o-phenylenediamine compounds or c) one or more hindered phenol compounds; or a combination of both b) and c). Catalytic antioxidants are more fully described in U.S. Pat. No. 8,048,833, herein incorporated by reference in its entirety.

Illustrative aromatic amine antioxidants include phenyl-alpha-naphthylamine which is described by the following molecular structure:

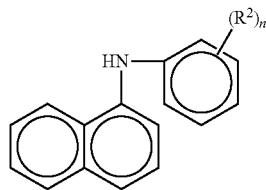

wherein $R^z$ is hydrogen or a $C_1$ to $C_{14}$ linear or $C_3$ to $C_{14}$ branched alkyl group, preferably $C_1$ to $C_{10}$ linear or $C_3$ to $C_{10}$ branched alkyl group, more preferably linear or branched $C_6$ to $C_8$ and n is an integer ranging from 1 to 5 preferably 1. A particular example is Irganox L06.

Other aromatic amine antioxidants include other alkylated and non-alkylated aromatic amines such as aromatic monoamines Typical aromatic amines antioxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine antioxidants which may be present include diphenylamines, phenothiazines, imidodibenzyls and diphenyl phenylene diamines. Mixtures of two or more of such other additional aromatic amines may also be present. Polymeric amine antioxidants can also be used.

The antioxidants or oxidation inhibitors that are useful in heat transfer fluids of the disclosure are the hindered phenols (e.g., 2,6-di-(t-butyl)phenol); aromatic amines (e.g., alkylated diphenyl amines); alkyl polysulfides; selenides; borates (e.g., epoxide/boric acid reaction products); phosphorodithioic acids, esters and/or salts; and the dithiocarbamate (e.g., zinc dithiocarbamates). In an embodiment, these antioxidants or oxidation inhibitors can be employed individually or at ratios of amine/phenolic from 1:10 to 10:1 of the mixtures preferred.

The antioxidants or oxidation inhibitors that are also useful in heat transfer fluid compositions of the disclosure are chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfiirized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)(phosphorodithioate, cadmium dinonylphosphorodithioate, and the reaction of phosphorus pentasulfide with an equimolar mixture of isopropyl alcohol, 4-methyl-2-pentanol, and n-hexyl alcohol.

Oxidation inhibitors including organic compounds containing sulfur, nitrogen, phosphorus and some alkylphenols are useful additives in the heat transfer fluid formulations of this disclosure. Two general types of oxidation inhibitors are those that react with the initiators, peroxy radicals, and hydroperoxides to form inactive compounds, and those that decompose these materials to form less active compounds. Examples are hindered (alkylated) phenols, e.g. 6-di(tert-butyl)-4-methyl-phenol[2,6-di(tert-butyl)-p-cresol, DBPC], and aromatic amines, e.g. N-phenyl-alpha-naphthalamine.

Sulfurized alkyl phenols and alkali or alkaline earth metal salts thereof also are useful antioxidants.

Another class of antioxidant used in heat transfer fluid compositions and which may also be present are oil-soluble copper compounds. Any oil-soluble suitable copper compound may be blended into the heat transfer fluid. Examples of suitable copper antioxidants include copper dihydrocarbyl thio- or dithio-phosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are known to be particularly useful.

A sulfur-containing antioxidant may be any and every antioxidant containing sulfur, for example, including dialkyl thiodipropionates such as dilauryl thiodipropionate and distearyl thiodipropionate, dialkyldithiocarbamic acid derivatives (excluding metal salts), bis(3,5-di-t-butyl-4-hydroxybenzyl)sulfide, mercaptobenzothiazole, reaction products of phosphorus pentoxide and olefins, and dicetyl sulfide. Of these, preferred are dialkyl thiodipropionates such as dilauryl thiodipropionate and distearyl thiodipropionate. The amine-type antioxidant includes, for example, monoalkyldiphenylamines such as monooctyldiphenylamine and mononyldiphenyl amine; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine and 4,4'-dinonyldiphenylamine; polyalkyldiphenylamines such as tetrabutyldiphenylamine, tetrahexyldiphenylamine, tetraoctyldiphenylamine and tetranonyldiphenylamine; and naphthylamines such as alpha-naphthylamine, phenyl-alpha-naphthylamine, butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine and nonylphenyl-alpha-naphthylamine. Of these, preferred are dialkyldiphenylamines Examples of sulphur-based antioxidants include dialkylsulphides such as didodecylsulphide and dioctadecylsulphide; thiodipropionic acid esters such as didodecyl thiodipropionate, dioctadecyl thiodipropionate, dimyristyl thiodipropionate and dodecyloctadecyl thiodipropionate, and 2-mercaptobenzimidazole.

Such antioxidants may be used individually or as mixtures of one or more types of antioxidants, the total amount employed being an amount of about 0.01 to about 5 wt %, preferably 0.1 to about 4.5 wt %, more preferably 0.25 to 3 wt % (on an as-received basis).

Corrosion Inhibitors

The heat transfer fluid compositions can include at least one corrosion inhibitor. Corrosion inhibitors are used to reduce the degradation of metallic parts that are in contact with the heat transfer fluid oil composition. Suitable corrosion inhibitors include aryl thiazines, alkyl substituted dimercaptothiodiazoles, alkyl substituted dimercaptothiadiazoles, and mixtures thereof.

Corrosion inhibitors are additives that protect metal surfaces against chemical attack by water or other contaminants. A wide variety of these are commercially available. As used herein, corrosion inhibitors include antirust additives and metal deactivators.

One type of corrosion inhibitor is a polar compound that wets the metal surface preferentially, protecting it with a film of oil. Another type of corrosion inhibitor absorbs water by incorporating it in a water-in-oil emulsion so that only the oil touches the metal surface. Yet another type of corrosion inhibitor chemically adheres to the metal to produce a non-reactive surface. Examples of suitable additives include zinc dithiophosphates, metal phenolates, basic metal sulfonates, fatty acids and amines Such additives may be used in an amount of about 0.01 to 5 weight percent, preferably about 0.01 to 1.5 weight percent.

Illustrative corrosion inhibitors include (short-chain) alkenyl succinic acids, partial esters thereof and nitrogen-containing derivatives thereof; and synthetic alkarylsulfonates, such as metal dinonylnaphthalene sulfonates. Corrosion inhibitors include, for example, monocarboxylic acids which have from 8 to 30 carbon atoms, alkyl or alkenyl succinates or partial esters thereof, hydroxy-fatty acids which have from 12 to 30 carbon atoms and derivatives thereof, sarcosines which have from 8 to 24 carbon atoms and derivatives thereof, amino acids and derivatives thereof, naphthenic acid and derivatives thereof, lanolin fatty acid, mercapto-fatty acids and paraffin oxides.

Particularly preferred corrosion inhibitors are indicated below. Examples of monocarboxylic acids ($C_8$-$C_{30}$), Caprylic acid, pelargonic acid, decanoic acid, undecanoic acid, lauric acid, myristic acid, palmitic acid, stearic acid, arachic acid, behenic acid, cerotic acid, montanic acid, melissic acid, oleic acid, docosanic acid, erucic acid, eicosenic acid, beef tallow fatty acid, soy bean fatty acid, coconut oil fatty acid, linolic acid, linoleic acid, tall oil fatty acid, 12-hydroxystearic acid, laurylsarcosinic acid, myritsylsarcosinic acid, palmitylsarcosinic acid, stearylsarcosinic acid, oleylsarcosinic acid, alkylated ($C_8$-$C_{20}$) phenoxyacetic acids, lanolin fatty acid and $C_8$-$C_{24}$ mercapto-fatty acids.

Examples of polybasic carboxylic acids which function as corrosion inhibitors include alkenyl ($C_{10}$-$C_{100}$) succinic acids and ester derivatives thereof, dimer acid, N-acyl-N-alkyloxyalkyl aspartic acid esters (U.S. Pat. No. 5,275,749).

Examples of the alkylamines which function as corrosion inhibitors or as reaction products with the above carboxylates to give amides and the like are represented by primary amines such as laurylamine, coconut-amine, n-tridecylamine, myristylamine, n-pentadecylamine, palmitylamine, n-heptadecylamine, stearylamine, n-nonadecylamine, n-eicosylamine, n-heneicosylamine, n-docosylamine, n-tricosylamine, n-pentacosylamine, oleylamine, beef tallow-amine, hydrogenated beef tallow-amine and soy bean-amine. Examples of the secondary amines include dilaurylamine, di-coconut-amine, di-n-tri decyl amine, dimyristylamine, di-n-pentadecylamine, dipalmitylamine, di-n-pentadecylamine, distearylamine, di-n-nonadecylamine, di-n-eicosylamine, di-n-heneicosylamine, di-n-docosylamine, di-n-tricosylamine, di-n-pentacosyl-amine, dioleylamine, di-beef tallow-amine, di-hydrogenated beef tallow-amine and di-soy bean-amine. Examples of the aforementioned N-alkylpolyalkyenediamines include: ethylenediamines such as laurylethylenediamine, coconut ethylenediamine, n-tridecylethylenediamine-, myristylethylenediamine, n-pentadecylethylenediamine, palmitylethylenediamine, n-heptadecylethylenediamine, stearylethylenediamine, n-nonadecylethylenediamine, n-eicosylethylenediamine, n-heneicosylethylenediamine, n-docosylethylendiamine, n-tricosylethylenediamine, n-pentacosylethylenediamine, oleylethylenediamine, beef tallow-ethylenediamine, hydrogenated beef tallow-ethylenediamine and soy bean-ethylenediamine; propylenediamines such as laurylpropylenediamine, coconut propylenediamine, n-tridecylpropylenediamine, myristylpropylenediamine, n-pentadecylpropylenediamine, palmitylpropylenediamine, n-heptadecylpropylenediamine, stearylpropylenediamine, n-nonadecylpropylenediamine, n-eicosylpropylenediamine, n-heneicosylpropylenediamine, n-docosylpropylendiamine, n-tricosylpropylenediamine, n-pentacosylpropylenediamine, diethylene triamine (DETA) or triethylene tetramine (TETA), oleylpropylenediamine, beef tallow-propylenediamine, hydrogenated beef tallow-propylenediamine and soy bean-propylenediamine; butylenediamines such as laurylbutylenediamine, coconut butylenediamine, n-tridecylbutylenediamine- myristylbutylenediamine, n-pentadecylbutylenediamine, stearylbutylenediamine, n-eicosylbutylenediamine, n-heneicosylbutylenedia-mine, n-docosylbutylendiamine, n-tricosylbutylenediamine, n-pentacosylbutylenediamine, oleyl-butylenediamine, beef tallow-butylenediamine, hydrogenated beef tallow-butylenediamine and soy bean butylenediamine; and pentylenediamines such as laurylpentylenediamine, coconut pentylenediamine, myristylpentylenediamine, palmitylpentylenediamine, stearylpentylenediamine, oleyl-pentylenediamine, beef tallow-pentylenediamine, hydrogenated beef tallow-pentylenediamine and soy bean pentylenediamine Other illustrative corrosion inhibitors include 2,5-dimercapto-1,3,4-thiadiazoles and derivatives thereof, mercaptobenzothiazoles, alkyltriazoles and benzotriazoles. Examples of dibasic acids useful as corrosion inhibitors, which may be used in the present disclosure, are sebacic acid, adipic acid, azelaic acid, dodecanedioic acid, 3-methyladipic acid, 3-nitrophthalic acid, 1,10-decanedicarboxylic acid, and fumaric acid. The corrosion inhibitors can be a straight or branch-chained, saturated or unsaturated monocarboxylic acid or ester thereof which may optionally be sulphurised in an amount up to 35% by weight. Preferably the acid is a $C_4$ to $C_{22}$ straight chain unsaturated monocarboxylic acid. The preferred concentration of this additive is from 0.001% to 0.35% by weight of the total heat transfer fluid composition. The preferred monocarboxylic acid is sulphurised oleic acid. However, other suitable materials are oleic acid itself; valeric acid and erucic acid. An illustrative corrosion inhibitor includes a triazole as previously defined. The triazole should be used at a concentration from 0.005% to 0.25% by weight of the total composition. The preferred triazole is tolylotriazole which may be included in the compositions of the disclosure include triazoles, thiazoles and certain diamine compounds which are useful as metal deactivators or metal passivators. Examples include triazole, benzotriazole and substituted benzotriazoles such as alkyl substituted derivatives. The alkyl substituent generally contains up to 1.5 carbon atoms, preferably up to 8 carbon atoms. The triazoles may contain other substituents on the aromatic ring such as halogens, nitro, amino, mercapto, etc. Examples of suitable compounds are benzotriazole and the tolyltriazoles, ethylbenzotriazoles, hexylbenzotriazoles, octylbenzotriazoles, chlorobenzotriazoles and nitrobenzotriazoles. Benzotriazole and tolyltriazole are particularly preferred. A straight or branched chain saturated or unsaturated monocarboxylic acid which is optionally sulphurised in an amount which may be up to 35% by weight; or an ester of such an acid; and a triazole or alkyl derivatives thereof, or short chain alkyl of up to 5 carbon atoms; n is zero or an integer between 1 and 3 inclusive; and is hydrogen, morpholino, alkyl, amido, amino, hydroxy or alkyl or aryl substituted derivatives thereof; or a triazole selected from 1,2,4 triazole, 1,2,3 triazole, 5-anilo-1,2,3,4-thiatriazole, 3-amino-1,2,4 triazole, 1-H-benzotriazole-1-yl-methylisocyanide, methylene-bis-benzotriazole and naphthotriazole.

The corrosion inhibitors may be used in an amount of 0.01 to 5 wt %, preferably 0.01 to 1.5 wt %, more preferably 0.01 to 0.2 wt %, still more preferably 0.01 to 0.1 wt % (on an as-received basis) based on the total weight of the heat transfer fluid composition.

Antifoam Agents

Antifoam agents may advantageously be added to heat transfer fluid compositions. These agents retard the formation of stable foams. Silicones and organic polymers are typical antifoam agents. For example, polysiloxanes, such as silicon oil or polydimethyl siloxane, provide antifoam properties. Antifoam agents are commercially available and may be used in conventional minor amounts along with other additives such as demulsifiers; usually the amount of these additives combined is less than 1 weight percent and often less than 0.1 weight percent. In an embodiment, such additives may be used in an amount of about 0.01 to 5 weight percent, preferably 0.1 to 3 weight percent, more preferably about 0.5 to 1.5 weight percent.

Antiwear Additives

The heat transfer fluid compositions may include at least one antiwear agent. Examples of suitable antiwear agents include oil soluble amine salts of phosphorus compounds, sulphurized olefins, metal dihydrocarbyldithio-phosphates (such as zinc dialkyldithiophosphates), thiocarbamate-containing compounds, such as thiocarbamate esters, thiocarbamate amides, thiocarbamic ethers, alkylene-coupled thiocarbamates, and bis(S-alkyldithiocarbamyl) disulphides.

Antiwear agents used in the formulation of the heat transfer fluid may be ashless or ash-forming in nature. Preferably, the antiwear agent is ashless. So called ashless antiwear agents are materials that form substantially no ash upon combustion. For example, non-metal-containing antiwear agents are considered ashless.

In one embodiment, oil soluble phosphorus amine antiwear agents include an amine salt of a phosphorus acid ester or mixtures thereof. The amine salt of a phosphorus acid ester includes phosphoric acid esters and amine sails thereof; dialkyldithiophosphoric acid esters and amine salts thereof; amine salts of phosphites; and amine salts of phosphorus-containing carboxylic esters, ethers, and amides; and mixtures thereof. The amine salt of a phosphorus acid ester may be used alone or in combination.

In one embodiment, oil soluble phosphorus amine salts include partial amine salt-partial metal salt compounds or mixtures thereof. In one embodiment, the phosphorus compound further includes a sulphur atom in the molecule. In one embodiment, the amine salt of the phosphorus compound may be ashless, i.e., metal-free (prior to being mixed with other components).

The amines which may be suitable for use as the amine salt include primary amines, secondary amines, tertiary amines, and mixtures thereof. The amines include those with at least one hydrocarbyl group, or, in certain embodiments, two or three hydrocarbyl groups. The hydrocarbyl groups may contain 2 to 30 carbon atoms, or in other embodiments 8 to 26, or 10 to 20, or 13 to 19 carbon atoms.

Primary amines include ethylamine, propylamine, butylamine, 2-ethylhexylamine, octylamine, and dodecylamine, as well as such fatty amines as n-octylamine, n-decylamine, n-dodecylamine, n-tetradecylamine, n-hexadecylamine, n-octadecylamine and oleyamine Other useful fatty amines include commercially available fatty amines such as "Armeen™" amines (products available from Akzo Chemicals, Chicago, Ill.), such as Armeen C, Armeen O, Armeen OL, Armeen T, Armeen HT, Armeen S and Armeen SD, wherein the letter designation relates to the fatty group, such as coco, oleyl, tallow, or stearyl groups.

Examples of suitable secondary amines include dim ethylamine, diethylamine, dipropylamine, dibutylamine, diamylamine, dihexylamine, diheptylamine, methylethylamine, ethylbutylamine and ethylamylamine. The secondary amines may be cyclic amines such as piperidine, piperazine and morpholine.

The amine may also be a tertiary-aliphatic primary amine. The aliphatic group in this case may be an alkyl group containing 2 to 30, or 6 to 26, or 8 to 24 carbon atoms. Tertiary alkyl amines include monoamines such as tert-butylamine, tert-hexylamine, 1-methyl-1-amino-cyclohexane, tert-octylamine, tert-decylamine, tertdodecylamine, tert-tetradecylamine, tert-hexadecylamine, tert-octadecylamine, tert-tetracosanylamine, and tert-octacosanylamine In one embodiment, the phosphorus acid amine salt includes an amine with $C_{11}$ to $C_{14}$ tertiary alkyl primary groups or mixtures thereof. In one embodiment the phosphorus acid amine salt includes an amine with $C_{14}$ to $C_{18}$ tertiary alkyl primary amines or mixtures thereof. In one embodiment the phosphorus acid amine salt includes an amine with $C_{18}$ to $C_{22}$ tertiary alkyl primary amines or mixtures thereof.

Mixtures of amines may also be used in the disclosure. In one embodiment a useful mixture of amines is "Primene™ 81R" and "Primene™ JMT." Primene™ 81R and Primene™ JMT (both produced and sold by Rohm & Haas) are mixtures of $C_{11}$ to $C_{14}$ tertiary alkyl primary amines and $C_{18}$ to $C_{22}$ tertiary alkyl primary amines respectively.

In one embodiment, oil soluble amine salts of phosphorus compounds include a sulphur-free amine salt of a phosphorus-containing compound may be obtained/obtainable by a process comprising: reacting an amine with either (i) a hydroxy-substituted di-ester of phosphoric acid, or (ii) a phosphorylated hydroxy-substituted di- or tri-ester of phosphoric acid. A more detailed description of compounds of this type is disclosed in International Application PCT/US08/051126.

In one embodiment, the hydrocarbyl amine salt of an alkylphosphoric acid ester is the reaction product of a $C_{14}$ to $C_{18}$ alkylated phosphoric acid with Primene 81RT™ (produced and sold by Rohm & Haas) which is a mixture of $C_{11}$ to $C_{14}$ tertiary alkyl primary amines Examples of hydrocarbyl amine salts of dialkyldithiophosphoric acid esters include the reaction product(s) of isopropyl, methyl-amyl (4-methyl-2-pentyl or mixtures thereof), 2-ethylhexyl, heptyl, octyl or nonyl dithiophosphoric acids with ethylene diamine, morpholine, or Primene 81R™, and mixtures thereof.

In one embodiment, the dithiophosphoric acid may be reacted with an epoxide or a glycol. This reaction product is further reacted with a phosphorus acid, anhydride, or lower ester. The epoxide includes an aliphatic epoxide or a styrene oxide. Examples of useful epoxides include ethylene oxide, propylene oxide, butene oxide, octene oxide, dodecene oxide, and styrene oxide. In one embodiment, the epoxide may be propylene oxide. The glycols may be aliphatic glycols having from 1 to 12, or from 2 to 6, or 2 to 3 carbon atoms. The dithiophosphoric acids, glycols, epoxides, inorganic phosphorus reagents and methods of reacting the same are described in U.S. Pat. Nos. 3,197,405 and 3,544,465. The resulting acids may then be salted with amines The dithiocarbamate-containing compounds may be prepared by reacting a dithiocarbamate acid or salt with an unsaturated compound. The dithiocarbamate containing compounds may also be prepared by simultaneously reacting an amine, carbon disulphide and an unsaturated compound. Generally, the reaction occurs at a temperature from 25° C. to 125° C.

Examples of suitable olefins that may be sulphurised to form the sulphurised olefin include propylene, butylene, isobutylene, pentene, hexane, heptene, octane, nonene, decene, undecene, dodecene, undecyl, tridecene, tetradecene, pentadecene, hexadecene, heptadecene, octadecene, octadecenene, nonodecene, eicosene or mixtures thereof. In one embodiment, hexadecene, heptadecene, octadecene, octadecenene, nonodecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulphurised olefin includes fatty acids and their esters. The fatty acids are often obtained from vegetable oil or animal oil; and typically contain 4 to 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. In one embodiment fatty acids and/or ester are mixed with olefins.

Polyols include diols, triols, and alcohols with higher numbers of alcoholic OH groups. Polyhydric alcohols include ethylene glycols, including di-, tri- and tetraethylene glycols; propylene glycols, including di-, tri- and tetrapropylene glycols; glycerol; butane diol; hexane diol; sorbitol; arabitol; mannitol; sucrose; fructose; glucose; cyclohexane diol; erythritol; and penta-erythritols, including di- and tripentaerythritol. Often the polyol is diethylene glycol, triethylene glycol, glycerol, sorbitol, penta erythritol or dipentaerythritol.

In an alternative embodiment, the ashless antiwear agent may be a monoester of a polyol and an aliphatic carboxylic acid, often an acid containing 12 to 24 carbon atoms. Often the monoester of a polyol and an aliphatic carboxylic acid is in the form of a mixture with a sunflower oil or the like, which may be present in the mixture from 5 to 95, in several embodiments from 10 to 90, or from 20 to 85, or 20 to 80 weight percent of said mixture. The aliphatic carboxylic acids (especially a monocarboxylic acid) which form the esters are those acids typically containing 12 to 24, or from 14 to 20 carbon atoms. Examples of carboxylic acids include dodecanoic acid, stearic acid, lauric acid, behenic acid, and oleic acid.

Illustrative antiwear additives useful in this disclosure include, for example, metal salts of a carboxylic acid. The metal is selected from a transition metal and mixtures thereof. The carboxylic acid is selected from an aliphatic carboxylic acid, a cycloaliphatic carboxylic acid, an aromatic carboxylic acid, and mixtures thereof.

The metal is preferably selected from a Group 10, 11 and 12 metal, and mixtures thereof. The carboxylic acid is preferably an aliphatic, saturated, unbranched carboxylic acid having from about 8 to about 26 carbon atoms, and mixtures thereof.

The metal is preferably selected from nickel (Ni), palladium (Pd), platinum (Pt), copper (Cu), silver (Ag), gold (Au), zinc (Zn), and mixtures thereof.

The carboxylic acid is preferably selected from caprylic acid (C8), pelargonic acid (C9), capric acid (C10), undecylic acid (C11), lauric acid (C12), tridecylic acid (C13), myristic acid (C14), pentadecylic acid (C15), palmitic acid (C16), margaric acid (C17), stearic acid (C18), nonadecylic acid (C19), arachidic acid (C20), heneicosylic acid (C21), behenic acid (C22), tricosylic acid (C23), lignoceric acid (C24), pentacosylic acid (C25), cerotic acid (C26), and mixtures thereof.

Preferably, the metal salt of a carboxylic acid comprises zinc stearate, silver stearate, palladium stearate, zinc palmitate, silver palmitate, palladium palmitate, and mixtures thereof.

The metal salt of a carboxylic acid can be present in the heat transfer fluid formulations of this disclosure in an amount of from about 0.01 weight percent to about 5 weight percent, based on the total weight of the formulated oil.

A metal alkylthiophosphate and more particularly a metal dialkyl dithio phosphate in which the metal constituent is zinc, or zinc dialkyl dithio phosphate (ZDDP) can be a useful component of the heat transfer fluids of this disclosure. ZDDP can be derived from primary alcohols, secondary alcohols or mixtures thereof. ZDDP compounds generally are of the formula:

where $R^1$ and $R^2$ are $C_1$-$C_{18}$ is alkyl groups, preferably $C_2$-$C_{12}$ alkyl groups. These alkyl groups may be straight chain or branched. Alcohols used in the ZDDP can be 2-propanol, butanol, secondary butanol, pentanols, hexanols such as 4-methyl-2-pentanol, n-hexanol, n-octanol, 2-ethyl hexanol, alkylated phenols, and the like. Mixtures of secondary alcohols or of primary and secondary alcohol can be preferred. Alkyl aryl groups may also be used.

Preferable zinc dithiophosphates which are commercially available include secondary zinc dithiophosphates such as those available from for example, The Lubrizol Corporation under the trade designations "LZ 677A", "LZ 1095" and "LZ 1371", from for example Chevron Oronite under the trade designation "OLOA 262" and from for example Afton Chemical under the trade designation "HITEC 7169".

The ZDDP is typically used in amounts of from about 0.4 weight percent to about 1.2 weight percent, preferably from about 0.5 weight percent to about 1.0 weight percent, and more preferably from about 0.6 weight percent to about 0.8 weight percent, based on the total weight of the heat transfer fluid, although more or less can often be used advantageously. Preferably, the ZDDP is a secondary ZDDP and present in an amount of from about 0.6 to 1.0 weight percent of the total weight of the heat transfer fluid.

Low phosphorus heat transfer fluid formulations are included in this disclosure. For such formulations, the phosphorus content is typically less than about 0.12 weight percent preferably less than about 0.10 weight percent and most preferably less than about 0.085 weight percent.

Other illustrative antiwear agents useful in this disclosure include, for example, zinc alkyldithiophosphates, aryl phosphates and phosphites, sulfur-containing esters, phosphosulfur compounds, and metal or ash-free dithiocarbamates.

The antiwear additive concentration in the heat transfer fluids of this disclosure can range from about 0.01 to about 5 weight percent, preferably about 0.1 to 4.5 weight percent, and more preferably from about 0.2 weight percent to about 4 weight percent, based on the total weight of the heat transfer fluid.

Other Additives

The formulated heat transfer fluid useful in the present disclosure may additionally contain one or more of the other commonly used heat transfer fluid performance additives including but not limited to dispersants, detergents, viscosity modifiers, metal passivators, ionic liquids, extreme pressure additives, anti-seizure agents, wax modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0; see also U.S. Pat. No. 7,704,930, the disclosure of which is incorporated herein in its entirety. These additives are commonly delivered with varying amounts of diluent oil, that may range from 5 weight percent to 50 weight percent.

The additives useful in this disclosure do not have to be soluble in the heat transfer fluids. Insoluble additives such as zinc stearate in oil can be dispersed in the heat transfer fluids of this disclosure.

The types and quantities of performance additives used in combination with the instant disclosure in heat transfer fluid compositions are not limited by the examples shown herein as illustrations.

Dispersants

The heat transfer fluid compositions may include at least one dispersant. During electrical apparatus component operation, oil-insoluble oxidation byproducts are produced. Dispersants help keep these byproducts in solution, thus diminishing their deposition on metal surfaces. Dispersants used in the formulation of the heat transfer fluid may be ashless or ash-forming in nature. Preferably, the dispersant is ashless. So called ashless dispersants are organic materials that form substantially no ash upon combustion. For example, non-metal-containing or borated metal-free dispersants are considered ashless.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

A particularly useful class of dispersants are the (poly) alkenylsuccinic derivatives, typically produced by the reaction of a long chain hydrocarbyl substituted succinic compound, usually a hydrocarbyl substituted succinic anhydride, with a polyhydroxy or polyamino compound. The long chain hydrocarbyl group constituting the oleophilic portion of the molecule which confers solubility in the oil, is normally a polyisobutylene group. Many examples of this type of dispersant are well known commercially and in the literature. Exemplary U.S. patents describing such dispersants are U.S. Pat. Nos. 3,172,892; 3,2145,707; 3,219,666; 3,316,177; 3,341,542; 3,444,170; 3,454,607; 3,541,012; 3,630,904; 3,632,511; 3,787,374 and 4,234,435. Other types of dispersant are described in U.S. Pat. Nos. 3,036,003; 3,200,107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants may be found, for example, in European Patent Application No. 471 071, to which reference is made for this purpose.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between hydrocarbyl substituted succinic anhydrides and amines Molar ratios can vary depending on the polyamine. For example, the molar ratio of hydrocarbyl substituted succinic anhydride to TEPA can vary from about 1:1 to about 5:1. Representative examples are shown in U.S. Pat. Nos. 3,087,936; 3,172,892; 3,219,666; 3,272,746; 3,322,670; and 3,652,616, 3,948,800.

Succinate esters are formed by the condensation reaction between hydrocarbyl substituted succinic anhydrides and alcohols or polyols. Molar ratios can vary depending on the alcohol or polyol used. For example, the condensation product of a hydrocarbyl substituted succinic anhydride and pentaerythritol is a useful dispersant.

Succinate ester amides are formed by condensation reaction between hydrocarbyl substituted succinic anhydrides and alkanol amines. For example, suitable alkanol amines include ethoxylated polyalkylpolyamines, propoxylated polyalkylpolyamines and polyalkenylpolyamines such as polyethylene polyamines One example is propoxylated hexamethylenediamine Representative examples are shown in U.S. Pat. No. 4,426,305.

The molecular weight of the hydrocarbyl substituted succinic anhydrides used in the preceding paragraphs will typically range between 800 and 2,500 or more. The above products can be post-reacted with various reagents such as sulfur, oxygen, formaldehyde, carboxylic acids such as oleic acid. The above products can also be post reacted with boron compounds such as boric acid, borate esters or highly borated dispersants, to form borated dispersants generally having from about 0.1 to about 5 moles of boron per mole of dispersant reaction product.

Mannich base dispersants are made from the reaction of alkylphenols, formaldehyde, and amines See U.S. Pat. No. 4,767,551, which is incorporated herein by reference. Process aids and catalysts, such as oleic acid and sulfonic acids, can also be part of the reaction mixture. Molecular weights of the alkylphenols range from 800 to 2,500. Representative examples are shown in U.S. Pat. Nos. 3,697,574; 3,703,536; 3,704,308; 3,751,365; 3,756,953; 3,798,165; and 3,803,039.

Typical high molecular weight aliphatic acid modified Mannich condensation products useful in this disclosure can be prepared from high molecular weight alkyl-substituted hydroxyaromatics or $HNR_2$ group-containing reactants.

Hydrocarbyl substituted amine ashless dispersant additives are well known to one skilled in the art; see, for example, U.S. Pat. Nos. 3,275,554; 3,438,757; 3,565,804; 3,755,433, 3,822,209, and 5,084,197.

Illustrative dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from about 500 to about 5000, or from about 1000 to about 3000, or about 1000 to about 2000, or a mixture of such hydrocarbylene groups, often with high terminal vinylic groups. Other preferred dispersants include succinic acid-esters and amides, alkylphenol-polyamine-coupled Mannich adducts, their capped derivatives, and other related components.

Polymethacrylate or polyacrylate derivatives are another class of dispersants. These dispersants are typically prepared by reacting a nitrogen containing monomer and a methacrylic or acrylic acid esters containing 5-25 carbon atoms in the ester group. Representative examples are shown in U.S. Pat. Nos. 2,100,993, and 6,323,164. Polymethacrylate and polyacrylate dispersants are normally used as multifunctional viscosity modifiers. The lower molecular weight versions can be used as heat transfer fluid dispersants or fuel detergents.

Other illustrative dispersants useful in this disclosure include those derived from polyalkenyl-substituted mono- or dicarboxylic acid, anhydride or ester, which dispersant has a polyalkenyl moiety with a number average molecular weight of at least 900 and from greater than 1.3 to 1.7, preferably from greater than 1.3 to 1.6, most preferably from greater than 1.3 to 1.5, functional groups (mono- or dicarboxylic acid producing moieties) per polyalkenyl moiety (a medium functionality dispersant). Functionality (F) can be determined according to the following formula:

$$F=(SAP \times M_n)/((112,200 \times A.I.)-(SAP \times 98))$$

wherein SAP is the saponification number (i.e., the number of milligrams of KOH consumed in the complete neutralization of the acid groups in one gram of the succinic-containing reaction product, as determined according to ASTM D94); $M_n$ is the number average molecular weight of the starting olefin polymer; and A.I. is the percent active ingredient of the succinic-containing reaction product (the remainder being unreacted olefin polymer, succinic anhydride and diluent).

The polyalkenyl moiety of the dispersant may have a number average molecular weight of at least 900, suitably at least 1500, preferably between 1800 and 3000, such as between 2000 and 2800, more preferably from about 2100 to 2500, and most preferably from about 2200 to about 2400. The molecular weight of a dispersant is generally expressed in terms of the molecular weight of the polyalkenyl moiety. This is because the precise molecular weight range of the dispersant depends on numerous parameters including the type of polymer used to derive the dispersant, the number of functional groups, and the type of nucleophilic group employed.

Polymer molecular weight, specifically $M_n$, can be determined by various known techniques. One convenient method is gel permeation chromatography (GPC), which additionally provides molecular weight distribution information (see W. W. Yau, J. J. Kirkland and D. D. Bly, "Modern Size Exclusion Liquid Chromatography", John Wiley and Sons, New York, 1979). Another useful method for determining molecular weight, particularly for lower molecular weight polymers, is vapor pressure osmometry (e.g., ASTM D3592).

The polyalkenyl moiety in a dispersant preferably has a narrow molecular weight distribution (MWD), also referred to as polydispersity, as determined by the ratio of weight average molecular weight ($M_w$) to number average molecular weight ($M_n$). Polymers having a $M_w/M_n$ of less than 2.2, preferably less than 2.0, are most desirable. Suitable polymers have a polydispersity of from about 1.5 to 2.1, preferably from about 1.6 to about 1.8.

Suitable polyalkenes employed in the formation of the dispersants include homopolymers, interpolymers or lower molecular weight hydrocarbons. One family of such polymers comprise polymers of ethylene and/or at least one $C_3$ to $C_{24}$ alpha-olefin. Preferably, such polymers comprise interpolymers of ethylene and at least one alpha-olefin of the above formula.

Another useful class of polymers is polymers prepared by cationic polymerization of monomers such as isobutene and styrene. Common polymers from this class include polyisobutenes obtained by polymerization of a $C_4$ refinery stream having a butene content of 35 to 75% by wt., and an isobutene content of 30 to 60% by wt. A preferred source of monomer for making poly-n-butenes is petroleum feedstreams such as Raffinate II. These feedstocks are disclosed in the art such as in U.S. Pat. No. 4,952,739. A preferred embodiment utilizes polyisobutylene prepared from a pure isobutylene stream or a Raffinate I stream to prepare reactive isobutylene polymers with terminal vinylidene olefins. Polyisobutene polymers that may be employed are generally based on a polymer chain of from 1500 to 3000.

Dispersants that contain the alkenyl or alkyl group have an Mn value of about 500 to about 5000 and an Mw/Mn ratio of about 1 to about 5. The preferred Mn intervals depend on the chemical nature of the agent improving filterability. Polyolefinic polymers suitable for the reaction with maleic anhydride or other acid materials or acid forming materials, include polymers containing a predominant quantity of $C_2$ to $C_5$ monoolefins, for example, ethylene, propylene, butylene, isobutylene and pentene. A highly suitable polyolefinic polymer is polyisobutene. The succinic anhydride preferred as a reaction substance is PIBSA, that is, polyisobutenyl succinic anhydride.

If the dispersant contains a succinimide comprising the reaction product of a succinic anhydride with a polyamine, the alkenyl or alkyl substituent of the succinic anhydride serving as the reaction substance consists preferably of polymerised isobutene having an Mn value of about 1200 to about 2500. More advantageously, the alkenyl or alkyl substituent of the succinic anhydride serving as the reaction substance consists in a polymerised isobutene having an Mn value of about 2100 to about 2400. If the agent improving filterability contains an ester of succinic acid comprising the reaction product of a succinic anhydride and an aliphatic polyhydric alcohol, the alkenyl or alkyl substituent of the succinic anhydride serving as the reaction substance consists advantageously of a polymerised isobutene having an Mn value of 500 to 1500. In preference, a polymerised isobutene having an Mn value of 850 to 1200 is used.

The amides may be amides of mono- or polycarboxylic acids or reactive derivatives thereof. The amides may be characterized by a hydrocarbyl group containing from about 6 to about 90 carbon atoms; each is independently hydrogen or a hydrocarbyl, aminohydrocarbyl, hydroxyhydrocarbyl or a heterocyclic-substituted hydrocarbyl group, provided that both are not hydrogen; each is, independently, a hydrocarbylene group containing up to about 10 carbon atoms.

The amide can be derived from a monocarboxylic acid, a hydrocarbyl group containing from 6 to about 30 or 38 carbon atoms and more often will be a hydrocarbyl group derived from a fatty acid containing from 12 to about 24 carbon atoms.

An illustrative amide that is derived from a di- or tricarboxylic acid, will contain from 6 to about 90 or more carbon atoms depending on the type of polycarboxylic acid. For example, when the amide is derived from a dimer acid, will contain from about 18 to about 44 carbon atoms or more, and amides derived from trimer acids generally will contain an average of from about 44 to about 90 carbon atoms. Each is independently hydrogen or a hydrocarbyl, aminohydrocarbyl, hydroxyhydrocarbyl or a heterocyclic-substituted hydrocarbon group containing up to about 10 carbon atoms. It may be independently heterocyclic substituted hydrocarbyl groups wherein the heterocyclic substituent is derived from pyrrole, pyrroline, pyrrolidine, morpholine, piperazine, piperidine, pyridine, pipecoline, etc. Specific examples include methyl, ethyl, n-propyl, n-butyl, n-hexyl, hydroxymethyl, hydroxyethyl, hydroxypropyl, amino-methyl, amino-ethyl, aminopropyl, 2-ethylpyridine, 1-ethylpyrrolidine, 1-ethylpiperidine, etc.

Illustrative aliphatic monoamines include mono-aliphatic and di-aliphatic-substituted amines wherein the aliphatic groups may be saturated or unsaturated and straight chain or branched chain. Such amines include, for example, mono- and di-alkyl-substituted amines, mono- and dialkenyl-substituted amines, etc. Specific examples of such monoamines include ethyl amine, diethyl amine, n-butyl amine, di-n-butyl amine, isobutyl amine, coco amine, stearyl amine, oleyl amine, etc. An example of a cycloaliphatic-substituted aliphatic amine is 2-(cyclohexyl)-ethyl amine. Examples of heterocyclic-substituted aliphatic amines include 2-(2-aminoethyl)-pyrrole, 2-(2-aminoethyl)-1-methylpyrrole, 2-(2-aminoethyl)-1-methylpyrrolidine and 4-(2-aminoethyl)morpholine, 1-(2-aminoethyl)piperazine, 1-(2-aminoethyl)piperidine, 2-(2-aminoethyl)pyridine, 1-(2-aminoethyl)pyrrolidine, 1-(3-aminopropyl)imidazole, 3-(2-aminopropyl)indole, 4-(3-aminopropyl)morpholine, 1-(3-aminopropyl)-2-pipecoline, 1-(3-aminopropyl)-2-pyrrolidinone, etc.

Illustrative cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine Illustrative aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include aniline, di-(para-methylphenyl)amine, naphthylamine, N-(n-butyl)-aniline, and the like.

Examples of aliphatic-substituted, cycloaliphatic-substituted, and heterocyclic-substituted aromatic monoamines are para-ethoxy-aniline, para-dodecylaniline, cyclohexyl-substituted naphthylamine, variously substituted phenathiazines, and thienyl-substituted aniline.

Illustrative polyamines are aliphatic, cycloaliphatic and aromatic polyamines analogous to the above-described monoamines except for the presence within their structure of additional amino nitrogens. The additional amino nitrogens can be primary, secondary or tertiary amino nitrogens. Examples of such polyamines include N-amino-propyl-cyclohexylamines, N,N'-di-n-butyl-paraphenylene diamine, bis-(para-aminophenyl)methane, 1,4-diaminocyclohexane, and the like.

Illustrative hydroxy-substituted amines are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutyl-amine, diethanolamine, di-(2-hydroxyamine, N-(hydroxypropyl)-propylamine, N-(2-methyl)-cyclohexylamine, 3-hydroxycyclopentyl parahydroxyaniline, N-hydroxyethal piperazine and the like.

In one embodiment, the amines are alkylene polyamines including hydrogen, or a hydrocarbyl, amino hydrocarbyl, hydroxyhydrocarbyl or heterocyclic-substituted hydrocarbyl group containing up to about 10 carbon atoms. Examples of such alkylene polyamines include methylene polyamines, ethylene polyamines, butylene polyamines, propylene polyamines, pentylene polyamines, hexylene polyamines, heptylene polyamines, etc.

Alkylene polyamines include ethylene diamine, triethylene tetramine, propylene diamine, trimethylene diamine, hexamethylene diamine, decamethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene)triamine, and the like. Higher homologs as are obtained by condensing two or more of the above-illustrated alkylene amines are useful, as are mixtures of two or more of any of the afore-described polyamines Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27-39, Interscience Publishers, Division of John Wiley and Sons, 1965, which is hereby incorporated by reference for the disclosure of useful polyamines Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than 2, usually less than 1% (by weight) material boiling below about 200° C. In the instance of ethylene polyamine bottoms, which are readily available and found to be quite useful, the bottoms contain less than about 2% (by weight) total diethylene triamine (DETA) or triethylene tetramine (TETA). A typical sample of such ethylene polyamine bottoms obtained from the Dow Chemical Company of Freeport, Tex. designated "E-100". Gas chromatography analysis of such a sample showed it to contain about 0.93% "Light Ends" (most probably DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylene triamine, triethylene tetramine and the like.

Illustrative dispersants are selected from: Mannich bases that are condensation reaction products of a high molecular weight phenol, an alkylene polyamine and an aldehyde such as formaldehyde; succinic-based dispersants that are reaction products of a olefin polymer and succinic acylating agent (acid, anhydride, ester or halide) further reacted with an organic hydroxy compound and/or an amine; high molecular weight amides and esters such as reaction products of a hydrocarbyl acylating agent and a polyhydric aliphatic alcohol (such as glycerol, pentaerythritol or sorbitol). Ashless (metal-free) polymeric materials that usually contain an oil soluble high molecular weight backbone linked to a polar functional group that associates with particles to be dispersed are typically used as dispersants. Zinc acetate capped, also any treated dispersant, which include borated, cyclic carbonate, end-capped, polyalkylene maleic anhydride and the like; mixtures of some of the above, in treat rates that range from about 0.1% up to 10-20% or more. Commonly used hydrocarbon backbone materials are olefin polymers and copolymers, i.e., ethylene, propylene, butylene, isobutylene, styrene; there may or may not be further functional groups incorporated into the backbone of the polymer, whose molecular weight ranges from 300 tp to 5000. Polar materials such as amines, alcohols, amides or esters are attached to the backbone via a bridge.

The dispersant(s) are preferably non-polymeric (e.g., mono- or bis-succinimides). Such dispersants can be prepared by conventional processes such as disclosed in U.S. Patent Application Publication No. 2008/0020950, the disclosure of which is incorporated herein by reference.

The dispersant(s) can be borated by conventional means, as generally disclosed in U.S. Pat. Nos. 3,087,936, 3,254,025 and 5,430,105.

Such dispersants may be used in an amount of about 0.01 to 20 weight percent or 0.01 to 10 weight percent, preferably about 0.5 to 8 weight percent, or more preferably 0.5 to 4 weight percent. Or such dispersants may be used in an amount of about 2 to 12 weight percent, preferably about 4 to 10 weight percent, or more preferably 6 to 9 weight percent. On an active ingredient basis, such additives may be used in an amount of about 0.06 to 14 weight percent, preferably about 0.3 to 6 weight percent. The hydrocarbon portion of the dispersant atoms can range from $C_{60}$ to $C_{1000}$, or from $C_{70}$ to $C_{300}$, or from $C_{70}$ to $C_{200}$. These dispersants may contain both neutral and basic nitrogen, and mixtures of both. Dispersants can be end-capped by borates and/or cyclic carbonates. Nitrogen content in the finished oil can vary from about 200 ppm by weight to about 2000 ppm by weight, preferably from about 200 ppm by weight to about 1200 ppm by weight. Basic nitrogen can vary from about 100 ppm by weight to about 1000 ppm by weight, preferably from about 100 ppm by weight to about 600 ppm by weight.

As used herein, the dispersant concentrations are given on an "as delivered" basis. Typically, the active dispersant is delivered with a process oil. The "as delivered" dispersant typically contains from about 20 weight percent to about 80 weight percent, or from about 40 weight percent to about 60 weight percent, of active dispersant in the "as delivered" dispersant product.

Detergents

The heat transfer fluid compositions may include at least one detergent. Illustrative detergents useful in this disclosure include, for example, alkali metal detergents, alkaline earth metal detergents, or mixtures of one or more alkali metal detergents and one or more alkaline earth metal detergents. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid (e.g., salicylic acid), phosphorous acid, phenol, or mixtures thereof. The counterion is typically an alkaline earth or alkali metal.

The detergent is preferably a metal salt of an organic or inorganic acid, a metal salt of a phenol, or mixtures thereof. The metal is preferably selected from an alkali metal, an alkaline earth metal, and mixtures thereof. The organic or inorganic acid is selected from an aliphatic organic or inorganic acid, a cycloaliphatic organic or inorganic acid, an aromatic organic or inorganic acid, and mixtures thereof.

The metal is preferably selected from an alkali metal, an alkaline earth metal, and mixtures thereof. More preferably, the metal is selected from calcium (Ca), magnesium (Mg), and mixtures thereof.

The organic acid or inorganic acid is preferably selected from a sulfur acid, a carboxylic acid, a phosphorus acid, and mixtures thereof.

Preferably, the metal salt of an organic or inorganic acid or the metal salt of a phenol comprises calcium phenate, calcium sulfonate, calcium salicylate, magnesium phenate, magnesium sulfonate, magnesium salicylate, and mixtures thereof.

Salts that contain a substantially stochiometric amount of the metal are described as neutral salts and have a total base number (TBN, as measured by ASTM D2896) of from 0 to 80. Many compositions are overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased. These detergents can be used in mixtures of neutral, overbased, highly overbased calcium salicylate, sulfonates, phenates and/or magnesium salicylate, sulfonates, phenates. The TBN ranges can vary from low, medium to high TBN products, including as low as 0 to as high as 600. Preferably the TBN delivered by the detergent is between 1 and 20. More preferably between 1 and 12. Mixtures of low, medium, high TBN can be used, along with mixtures of calcium and magnesium metal based detergents, and including sulfonates, phenates, salicylates, and carboxylates. A detergent mixture with a metal ratio of 1, in conjunction of a detergent with a metal ratio of 2, and as high as a detergent with a metal ratio of 5, can be used. Borated detergents can also be used.

Alkaline earth phenates are another useful class of detergent. These detergents can be made by reacting alkaline earth metal hydroxide or oxide (CaO, Ca(OH)$_2$, BaO, Ba(OH)$_2$, MgO, Mg(OH)$_2$, for example) with an alkyl phenol or sulfurized alkylphenol. Useful alkyl groups include straight chain or branched $C_1$-$C_{30}$ alkyl groups, preferably, $C_4$-$C_{20}$ or mixtures thereof. Examples of suitable phenols include isobutylphenol, 2-ethylhexylphenol, nonylphenol, dodecyl phenol, and the like. It should be noted that starting alkylphenols may contain more than one alkyl substituent that are each independently straight chain or branched and can be used from 0.5 to 6 weight percent. When a non-sulfurized alkylphenol is used, the sulfurized product may be obtained by methods well known in the art. These methods include heating a mixture of alkylphenol and sulfurizing agent (including elemental sulfur, sulfur halides such as sulfur dichloride, and the like) and then reacting the sulfurized phenol with an alkaline earth metal base.

Metal salts of carboxylic acids are useful detergents. These carboxylic acid detergents may be prepared by reacting a basic metal compound with at least one carboxylic acid and removing free water from the reaction product. Detergents made from salicylic acid are one preferred class of detergents derived from carboxylic acids. Useful salicylates include long chain alkyl salicylates. One useful family of compositions is of the formula

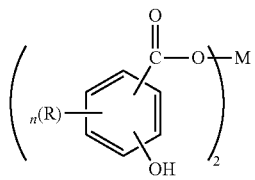

where R is an alkyl group having 1 to about 30 carbon atoms, n is an integer from 1 to 4, and M is an alkaline earth metal. Preferred R groups are alkyl chains of at least $C_{11}$, preferably $C_{13}$ or greater. R may be optionally substituted with substituents that do not interfere with the detergent's function. M is preferably, calcium, magnesium, or barium. More preferably, M is calcium.

Hydrocarbyl-substituted salicylic acids may be prepared from phenols by the Kolbe reaction (see U.S. Pat. No. 3,595,791). The metal salts of the hydrocarbyl-substituted salicylic acids may be prepared by double decomposition of a metal salt in a polar solvent such as water or alcohol.

Alkaline earth metal phosphates are also used as detergents and are known in the art.

Detergents may be simple detergents or what is known as hybrid or complex detergents. The latter detergents can provide the properties of two detergents without the need to blend separate materials. See U.S. Pat. No. 6,034,039.

Illustrative detergents include calcium alkylsalicylates, calcium alkylphenates and calcium alkarylsulfonates with alternate metal ions used such as magnesium, barium, or sodium. Examples of the cleaning and dispersing agents which can be used include metal-based detergents such as the neutral and basic alkaline earth metal sulphonates, alkaline earth metal phenates and alkaline earth metal salicylates alkenylsuccinimide and alkenylsuccinimide esters and their borohydrides, phenates, salienius complex detergents and ashless dispersing agents which have been modified with sulphur compounds. These agents can be added and used individually or in the form of mixtures, conveniently in an amount within the range of from 0.01 to 1 part by weight per 100 parts by weight of base oil; these can also be high TBN, low TBN, or mixtures of high/low TBN.

Preferred detergents include calcium sulfonates, magnesium sulfonates, calcium salicylates, magnesium salicylates, calcium phenates, magnesium phenates, and other related components (including borated detergents), and mixtures thereof. Preferred mixtures of detergents include magnesium sulfonate and calcium salicylate, magnesium sulfonate and calcium sulfonate, magnesium sulfonate and calcium phenate, calcium phenate and calcium salicylate, calcium phenate and calcium sulfonate, calcium phenate and magnesium salicylate, calcium phenate and magnesium phenate.

The detergent concentration in the heat transfer fluids of this disclosure can range from about 0.01 to about 10 weight percent, preferably about 0.1 to 7.5 weight percent, and more preferably from about 0.5 weight percent to about 5 weight percent, based on the total weight of the heat transfer fluid.

As used herein, the detergent concentrations are given on an "as delivered" basis. Typically, the active detergent is delivered with a process oil. The "as delivered" detergent typically contains from about 20 weight percent to about 100 weight percent, or from about 40 weight percent to about 60 weight percent, of active detergent in the "as delivered" detergent product.

Viscosity Modifiers

Viscosity modifiers (also known as viscosity index improvers (VI improvers), and viscosity improvers) can be included in the heat transfer fluid compositions of this disclosure.

Viscosity modifiers provide heat transfer fluids with high and low temperature operability. These additives impart shear stability at elevated temperatures and acceptable viscosity at low temperatures.

Suitable viscosity modifiers include high molecular weight hydrocarbons, polyesters and viscosity modifier dispersants that function as both a viscosity modifier and a dispersant. Typical molecular weights of these polymers are between about 10,000 to 1,500,000, more typically about 20,000 to 1,200,000, and even more typically between about 50,000 and 1,000,000.

Examples of suitable viscosity modifiers are linear or star-shaped polymers and copolymers of methacrylate, butadiene, olefins, or alkylated styrenes. Polyisobutylene is a commonly used viscosity modifier. Another suitable viscosity modifier is polymethacrylate (copolymers of various chain length alkyl methacrylates, for example), some formulations of which also serve as pour point depressants. Other suitable viscosity modifiers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

Olefin copolymers are commercially available from Chevron Oronite Company LLC under the trade designation "PARATONE®" (such as "PARATONE® 8921" and "PARATONE® 8941"); from Afton Chemical Corporation under the trade designation "HiTEC®" (such as "HiTEC® 5850B"; and from The Lubrizol Corporation under the trade designation "Lubrizol® 7067C". Hydrogenated polyisoprene star polymers are commercially available from Infineum International Limited, e.g., under the trade designation "SV200" and "SV600". Hydrogenated diene-styrene block copolymers are commercially available from Infineum International Limited, e.g., under the trade designation "SV 50".

The polymethacrylate or polyacrylate polymers can be linear polymers which are available from Evnoik Industries under the trade designation "Viscoplex®" (e.g., Viscoplex 6-954) or star polymers which are available from Lubrizol Corporation under the trade designation Asteric™ (e.g., Lubrizol 87708 and Lubrizol 87725).

Illustrative vinyl aromatic-containing polymers useful in this disclosure may be derived predominantly from vinyl aromatic hydrocarbon monomer. Illustrative vinyl aromatic-containing copolymers useful in this disclosure may be represented by the following general formula:

A-B wherein A is a polymeric block derived predominantly from vinyl aromatic hydrocarbon monomer, and B is a polymeric block derived predominantly from conjugated diene monomer.

In an embodiment of this disclosure, the viscosity modifiers may be used in an amount of less than about 10 weight percent, preferably less than about 7 weight percent, more preferably less than about 4 weight percent, and in certain instances, may be used at less than 2 weight percent, preferably less than about 1 weight percent, and more preferably less than about 0.5 weight percent, based on the total weight of the formulated heat transfer fluid. Viscosity modifiers are typically added as concentrates, in large amounts of diluent oil.

The viscosity modifiers may be used in an amount of 0.01 to 20 wt %, preferably 0.1 to 10 wt %, more preferably 0.5 to 7.5 wt %, still more preferably 1 to 5 wt % (on an as-received basis) based on the total weight of the heat transfer fluid composition.

As used herein, the viscosity modifier concentrations are given on an "as delivered" basis. Typically, the active polymer is delivered with a diluent oil. The "as delivered" viscosity modifier typically contains from 20 weight percent to 75 weight percent of an active polymer for polymethacrylate or polyacrylate polymers, or from 8 weight percent to 20 weight percent of an active polymer for olefin copolymers, hydrogenated polyisoprene star polymers, or hydrogenated diene-styrene block copolymers, in the "as delivered" polymer concentrate.

Metal Passivators

The heat transfer fluid compositions may include at least one metal passivator. The metal passivators/deactivators include, for example, benzotriazole, tolyltriazole, 2-mercaptobenzothiazole, dialkyl-2,5-dimercapto-1,3,4-thiadiazole; N,N'-disalicylideneethylenediamine, N,N'-disalicyli-denepropylenediamine; zinc dialkyldithiophosphates and dialkyl dithiocarbamates.

Some embodiments of the disclosure may further comprise a yellow metal passivator. As used herein, "yellow metal" refers to a metallurgical grouping that includes brass and bronze alloys, aluminum bronze, phosphor bronze, copper, copper nickel alloys, and beryllium copper. Typical yellow metal passivators include, for example, benzotriazole, totutriazole, tolyltriazole, mixtures of sodium tolutriazole and tolyltriazole, and combinations thereof. In one particular and non-limiting embodiment, a compound containing tolyltriazole is selected. Typical commercial yellow metal passivators include IRGAMET™-30, and IRGAMET™-42, available from Ciba Specialty Chemicals, now part of BASE, and VANLUBE™ 601 and 704, and CUVAN™ 303 and 484, available from R.T. Vanderbilt Company, Inc.

The metal passivator concentration in the heat transfer fluids of this disclosure can range from about 0.01 to about 5.0 weight percent, preferably about 0.01 to 3.0 weight percent, and more preferably from about 0.01 weight percent to about 1.5 weight percent, based on the total weight of the heat transfer fluid.

Ionic Liquids (ILs)

Ionic liquids are so-called salt melts which are preferably liquid at room temperature and/or by definition have a melting point <100° C. They have almost no vapor pressure and therefore have no cavitation properties. In addition, through the choice of the cations and anions in the ionic liquids, the lifetime of the heat transfer fluid is increased, and by adjusting the electric conductivity, these liquids can be used in equipment in which there is an electric charge buildup, e.g., electric vehicle components. Suitable cations for ionic liquids include a quaternary ammonium cation, a phosphonium cation, an imidazolium cation, a pyridinium cation, a pyrazolium cation, an oxazolium cation, a pyrrolidinium cation, a piperidinium cation, a thiazolium cation, a guanidinium cation, a morpholinium cation, a trialkylsulfonium cation or a triazolium cation, which may be substituted with an anion selected from the group consisting of $[PF_6]^-$, $[BF_4]^{31}$, $[CF_3CO_2]^{31}$, $[CF_3SO_3]^-$ as well as its higher homologs, $[C_4F_9—SO_3]^{31}$ or $[C_8F_{17}—SO_3]^-$ and higher perfluoroalkylsulfonates, $[(CF_3SO_2)_2N]^-$, $[(CF_3SO_2)(CF_3COO)N]^-$, $[R^1—SO_3]^-$, $[R^1—O—SO_3]^{31}$, $[R^1—COO]^-$, Cr, Br, $[NO_3]^-$, $[N(CN)_2]^-$, $[HSO_4]^-$, $PF_{(6-x)}R^3_x$ or $[R^1R^2PO_4]^-$ and the radicals $R^1$ and $R^2$ independently of one another are selected from hydrogen; linear or branched, saturated or unsaturated, aliphatic or alicyclic alkyl groups with 1 to 20 carbon atoms; heteroaryl, heteroaryl-$C_1$-$C_6$-alkyl groups with 3 to 8 carbon atoms in the heteroaryl radical and at least one heteroatom of N, O and S, which may be combined with at least one group selected from $C_1$-$C_6$ alkyl groups and/or halogen atoms; aryl-aryl $C_1$-$C_6$ alkyl groups with 5 to 12 carbon atoms in the aryl radical, which may be substituted with at least one $C_1$-$C_6$ alkyl group; $R^3$ may be a perfluoroethyl group or a higher perfluoroalkyl group, x is 1 to 4. However, other combinations are also possible.

Ionic liquids with highly fluorinated anions are especially preferred because they usually have a high thermal stability. The water uptake ability may definitely be reduced by such anions, e.g., in the case of the bis(trifluoromethylsutfonyl) imide anion.

Illustrative ionic liquids include, for example, butylmethylpyrrolidinium bis(trifluoromethylsulfonyl)imide (MBPimide), methylpropylpyrrolidinium bis(trifluoromethylsulfonyl)imide (MPPimide), hexylmethylimidazolium tris(perfluoroethyl)trifluorophosphate (HMIMPFET), hexylmethylimidazolium bis(trifluoromethylsulfonyl)imide (HMIMimide), hexylmethylpyrrolidinium bis(trifluoromethylsulfonyl)imide (HMP), tetrabutylphosphonium tris(perfluoroethyl)trifluorophosphate (BuPPFET), octylmethylimidazolium hexafluorophosphate (OMIM PF6), hexylpyridinium bis(trifluoromethyl)sulfonylimide (Hpyimide), methyltrioctylammonium trifluoroacetate (MOAac), butylmethylpyrrolidinium tris(pentafluoroethyl)trifluorophosphate (MBPPFET), trihexyl(tetradecyl)phosphonium bis(trifluoromethylsulfonyl)imide (HPDimide), 1-ethyl-3-methylimidazolium ethyl sulfate (EMIM ethyl sulfate), 1-ethyl-3-methylimidazolium bis(trifluoromethylsulfonyl) imide (EMIMimide), 1-ethyl-2,3-dimethylimidazolium bis(trifluoromethylsulfonyl)imide (EMMIMimide), N-ethyl-3-methylpyridinium nonafluorobutanesulfonate (EMPyflate), trihexyl(tetradecyl)phosphonium bis(trifluoromethylsulfonyl)amide, trihexyl(tetradecyl)phosphonium bis(2,4,4-trifluoromethylpentyl)phosphinate, tributyl(tetradecyl)phosphonium dodecylbenzenesulfonate, and the like.

Cation/anion combinations leading to ionic liquids include, for example, dialkylimidazolium, pyridinium, ammonium and phosphonium, etc. with organic anions such as sulfonates, imides, methides, etc., as well as inorganic anions such as halides and phosphates, etc., such that any other combination of cations and anions with which a low melting point can be achieved is also conceivable. Ionic liquids have an extremely low vapor pressure, depending on their chemical structure, are nonflammable and often have thermal stability up to more than 260° C. and furthermore are also suitable as heat transfer fluids.

The respective desired properties of the heat transfer fluids are achieved with the ionic liquids through a suitable choice of cations and anions. These desirable properties include adjusting electrical conductivity of the heat transfer fluid to spread the area of use, increasing the service life of the heat transfer fluid, and adjusting the viscosity to improve the temperature suitability. Suitable cations for ionic liquids have proven to be a phosphonium cation, an imidazolium cation, a pyridinium cation or a pyrrolidinium cation which may be combined with an anion containing fluorine and selected from bis(trifluoromethylsulfonyl)imide, bis(perfluoroalkylsulfonyl)imide, perfluoroalkyl sulfonate, tris(perfluoroalkyl)methidenes, bis(perfluoroalkyl)imidenes, bis(perfluoroaryl)imides, perfluoroarylperfluoroalkylsulfonylimides and tris(perfluoro-alkyl) trifluorophosphate or with a halogen-free alkyl sulfate anion.

Ionic liquids are preferred with highly fluorinated anions because they usually have a high thermal stability. The water uptake ability may be reduced significantly by such anions, e.g., when using bis(trifluoromethylsulfonyl) anion.

In an embodiment, such ionic liquid additives may be used in an amount of about 0.1 to 10 weight percent, preferably 0.5 to 7.5 weight percent, more preferably about 0.75 to 5 weight percent.

Antistatic Additives

In electrical apparatus components, static electricity is generated, especially when the heat transfer fluid is in use. To reduce that hazard, a conductive antistatic additive can be added to and distributed throughout the heat transfer fluid. This heat transfer fluid will thereby avoid reduction in its performance associated with local breakdown of the base stock and safety problems from static electric build-up.

A class of products called "antistatic fluids" or "antistatic additives", which also are petroleum distillates, can be added to adjust the conductivity of a heat transfer fluid to safe levels, e.g., at or above 100 pico-siemens per meter conductivity. Very small quantities of these antistatic fluids are required to raise the conductivity to the desired levels, namely, some 10 to 30 milliliters per 1,000 gallons of hydrocarbon.

According to another feature of the disclosure, the antistatic additive is selected from a population of commercially available materials based on the ability of the material's chemical compatibility with the heat transfer fluid and the cost effectiveness of adjusting the conductivity of the heat transfer fluid to the desired level for the heat transfer fluid's anticipated application.

Typical antistatic fluids are ExxonMobil™ Chemical's line of de-aromatized hydrocarbon fluids known as Exxsol™ fluids. Representative fluids and their distillation points include Exxsol™ antistatic fluids hexane (65 IBP (° C.) min, 71 DP (° C.) max, and additive amount 30 ml/1000 gal), D 40 (150 IBP (° C.) min, 210 DP (° C.) max, and additive amount 30 ml/1000 gal), D 3135 (152 IBP (° C.) min, 182 DP (° C.) max, and additive amount 10 ml/1000 gal), and D 60 (177 IBP (° C.) min, 220 DP (° C.) max, and additive amount 30 ml/1000 gal). The IBP is the temperature at which 1% of the material is distilled, and the DP is the temperature at which 96% of the material is distilled.

Other illustrative antistatic agents are based on long-chain aliphatic amines (optionally ethoxylated) and amides, quaternary ammonium salts (e.g., behentrimonium chloride or cocamidopropyl betaine), esters of phosphoric acid, polyethylene glycol esters, or polyols. Additional antistatic agents include long-chain alkyl phenols, ethoxylated amines, glycerol esters, such as glycerol monostearate, amides, glycols, and fatty acids.

The quantity of antistatic additive required to adjust the conductivity of the heat transfer fluid is determined by measuring the conductivity of the heat transfer fluid as the antistatic additive is mixed in and stopping when the desired conductivity consistent with the application to be reached. The amount of antistatic additive mixed in will range between 0.001% and 10% of the heat transfer fluid by weight, and preferentially between 1% and 7.5% by weight, though it may be mixed in at a liquid volume of between 10 and 100,000 parts per million.

Pour Point Depressants (PPDs)

Conventional pour point depressants (also known as lube oil flow improvers) may be added to the heat transfer fluid compositions of the present disclosure if desired. These pour point depressant may be added to heat transfer fluid compositions of the present disclosure to lower the minimum temperature at which the fluid will flow or can be poured. Examples of suitable pour point depressants include polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. U.S. Pat. Nos. 1,815,022; 2,015,748; 2,191,498; 2,387,501; 2,655, 479; 2,666,746; 2,721,877; 2,721,878; and 3,250,715 describe useful pour point depressants and/or the preparation thereof. Such additives may be used in an amount of about 0.01 to 5 weight percent, preferably 0.1 to 3 weight percent, more preferably about 0.5 to 1.5 weight percent.

Seal Compatibility Agents

The heat transfer fluid compositions can include at least one seal compatibility agent. Seal compatibility agents help to swell elastomeric seals by causing a chemical reaction in the fluid or physical change in the elastomer. Suitable seal compatibility agents for heat transfer fluids include organic phosphates, aromatic esters, aromatic hydrocarbons, esters (butylbenzyl phthalate, for example), and polybutenyl succinic anhydride. Such additives may be used in an amount of about 0.01 to 5 weight percent, preferably 0.1 to 3 weight percent, more preferably about 0.5 to 1.5 weight percent.

Friction Modifiers

The heat transfer fluid compositions can include at least one friction modifier. A friction modifier is any material or materials that can alter the coefficient of friction of a surface. Friction modifiers, also known as friction reducers, or lubricity agents or oiliness agents, and other such agents that change the ability of base oils, formulated heat transfer fluid compositions, or functional fluids, to modify the coefficient of friction of a surface may be effectively used in combination with the base oils or heat transfer fluid compositions of the present disclosure if desired. Friction modifiers that lower the coefficient of friction are particularly advantageous in combination with the base oils and lube compositions of this disclosure.

Illustrative friction modifiers may include, for example, organometallic compounds or materials, or mixtures thereof. Illustrative organometallic friction modifiers useful in the heat transfer fluid formulations of this disclosure include, for example, molybdenum amine, molybdenum diamine, an organotungstenate, a molybdenum dithiocarbamate, molybdenum dithiophosphates, molybdenum amine complexes, molybdenum carboxylates, and the like, and mixtures thereof. Similar tungsten based compounds may be preferable.

Other illustrative friction modifiers useful in the heat transfer fluid formulations of this disclosure include, for example, alkoxylated fatty acid esters, alkanolamides, polyol fatty acid esters, borated glycerol fatty acid esters, fatty alcohol ethers, and mixtures thereof.

Illustrative alkoxylated fatty acid esters include, for example, polyoxyethylene stearate, fatty acid polyglycol ester, and the like. These can include polyoxypropylene stearate, polyoxybutylene stearate, polyoxyethylene isosterate, polyoxypropylene isostearate, polyoxyethylene palmitate, and the like.

Illustrative alkanolamides include, for example, lauric acid diethylalkanolamide, palmic acid diethylalkanolamide, and the like. These can include oleic acid diethylalkanolamide, stearic acid diethylalkanolamide, oleic acid diethylalkanolamide, polyethoxylated hydrocarbylamides, polypropoxylated hydrocarbylamines, and the like.

Illustrative polyol fatty acid esters include, for example, glycerol mono-oleate, saturated mono-, di-, and tri-glyceride esters, glycerol mono-stearate, and the like. These can include polyol esters, hydroxyl-containing polyol esters, and the like.

Illustrative borated glycerol fatty acid esters include, for example, borated glycerol mono-oleate, borated saturated mono-, di-, and tri-glyceride esters, borated glycerol monosterate, and the like. In addition to glycerol polyols, these can include trimethylolpropane, pentaerythritol, sorbitan, and the like. These esters can be polyol monocarboxylate esters, polyol dicarboxylate esters, and on occasion polyol-tricarboxylate esters. Preferred can be the glycerol mono-oleates, glycerol dioleates, glycerol trioleates, glycerol monostearates, glycerol distearates, and glycerol tristearates and the corresponding glycerol monopalmitates, glycerol dipalmitates, and glycerol tripalmitates, and the respective isostearates, linoleates, and the like. On occasion the glycerol esters can be preferred as well as mixtures containing any of these. Ethoxylated, propoxylated, butoxylated fatty acid esters of polyols, especially using glycerol as underlying polyol can be preferred.

Illustrative fatty alcohol ethers include, for example, stearyl ether, myristyl ether, and the like. Alcohols, including those that have carbon numbers from $C_3$ to $C_{50}$, can be ethoxylated, propoxylated, or butoxylated to form the corresponding fatty alkyl ethers. The underlying alcohol portion can preferably be stearyl, myristyl, $C_{11}$-$C_{13}$ hydrocarbon, oleyl, isosteryl, and the like.

The heat transfer fluids of this disclosure exhibit desired properties, e.g., wear control, in the presence or absence of a friction modifier.

Useful concentrations of friction modifiers may range from 0.01 weight percent to 5 weight percent, or about 0.1 weight percent to about 2.5 weight percent, or about 0.1 weight percent to about 1.5 weight percent, or about 0.1 weight percent to about 1 weight percent. Concentrations of molybdenum-containing materials are often described in terms of Mo metal concentration. Advantageous concentrations of Mo may range from 25 ppm to 700 ppm or more, and often with a preferred range of 50-200 ppm. Friction modifiers of all types may be used alone or in mixtures with the materials of this disclosure. Often mixtures of two or more friction modifiers, or mixtures of friction modifier(s) with alternate surface active material(s), are also desirable.

Extreme Pressure Agents

The heat transfer fluid compositions can include at least one extreme pressure agent (EP). EP agents that are soluble in the oil include sulphur- and chlorosulphur-containing EP agents, chlorinated hydrocarbon EP agents and phosphorus EP agents. Examples of such EP agents include chlorinated wax; sulphurised olefins (such as sulphurised isobutylene), organic sulphides and polysulphides such as dibenzyldisulphide, bis-(chlorobenzyl)disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons such as the reaction product of phosphorus sulphide with turpentine or methyl oleate; phosphorus esters such as the dihydrocarbon and trihydrocarbon phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithio carbamate and barium heptylphenol diacid; amine salts of alkyl and dialkylphosphoric acids or derivatives; and mixtures thereof (as described in U.S. Pat. No. 3,197,405).

The extreme pressure agents may be used in an amount of 0.01 to 5 wt %, preferably 0.01 to 1.5 wt %, more preferably 0.01 to 0.2 wt %, still more preferably 0.01 to 0.1 wt % (on an as-received basis) based on the total weight of the heat transfer fluid composition.

Nanomaterials and Nanoparticles

The heat transfer fluids can include nanomaterials and/or nanoparticles. The nanomaterials and/or nanoparticles can advantageously alter the heat transfer properties of the heat transfer fluids of this disclosure.

The heat transfer fluids of this disclosure can exhibit advantaged heat transfer performance and properties in combination with engineered nanomaterials, nanomaterials, and nanoparticles.

Engineered nanomaterials, also known as nanomaterials, are materials comprising nanoparticles that are small-scale assemblies of atoms and/or molecules and that are produced to have unique/novel properties that are different from those of the corresponding bulk materials.

Nanoparticles are particles having one or more dimensions that are in the size range of about 1 nm to about 100 nm (nm=nanometers). In one aspect, a nanoparticle may be considered to act without consideration of a surrounding interfacial layer. In another aspect, a nanoparticle may be considered to act including the effects of an interfacial layer.

Nanomaterial and nanoparticle compositions comprise, for example, metals, (e.g. Au, Ag, Pd, Pt, Cu, Fe, combinations thereof, and the like), non-metals (e.g. C, B, Si, O, P, N, halides, combinations thereof, and the like), metalloids, metal alloys, intermetallics, conductors, semiconductors, insulators, electroactive materials; optically active, electro-optical, polarizing, polarizable materials; magnetic, ferromagnetic, diamagnetic, electromagnetic, non-magnetic materials; organics, heteroatom-containing organics, organometallics; inorganics, ceramics, metal oxides (e.g. Ti oxide, Zn oxide, Ce oxides, and the like); salts, complex salts, detergent-metal salt complexes, detergent-metal carbonate complexes, overbased detergent complexes, micellar-metal salt complexes, micellar-metal carbonate complexes, and combinations thereof; single crystal, multi-crystal, multi-crystalline, semi-crystalline, amorphous, semi-amorphous, glassy, combinations thereof, and the like.

Nanomaterials and nanoparticles also include, for example, agglomerated materials, non-agglomerated materials; hydrophobic soluble, insoluble, partially soluble materials; hydrophilic soluble, insoluble, partially soluble materials; fulleranes, fullerenes, functionalized derivatives thereof; carboranes, boranes, borates, boramines; boron-carbon, boron-heteraoatom, boron-metal/metalloid complexes; graphene, functionalized derivatives thereof; single-carbon-atom sheet or multi-sheet materials, functionalized derivatives thereof; single walled, seamless, cylindrical carbon nanotubes, functionalized derivatives thereof; nanotubes and functionalized derivatives thereof, containing e.g. carbon, boron, nitrides, heteroatoms, combinations thereof, and the like; nanotubes and functionalized derivatives thereof, that are e.g. single walled, multi-walled, coaxial, rolled scroll, uncapped, end-capped, and the like; nanowires and functionalized derivatives thereof, containing e.g. carbon, boron, nitrides, heteroatoms, combinations thereof, and the like; quantum dots comprising e.g. semiconductors, Cd selenide, Cd telluride, and the like; molecular sheets, that are e.g. single-layered, multi-layered, inter-layered, laminated, rolled, rolled scrolled, folded, intercalated, plates, platelets, and the like; nanowires that are e.g. molecular strings, molecular wires, molecular ropes, molecular cables, coaxial cables, single and multiple wires, coiled, spiraled, interwoven, and the like; core-shell, core-coated, surface modified, surface functionalized; morphologies, in some instances, having aspect ratios that are low in all dimensions, e.g. approaching 1, and in other instances, morphologies having aspect ratios that are high for at least one pair of dimensions, e.g. greater than 1, greater than 5, greater than 10, greater than 50, greater than 100, greater than 500, or even greater than 1000.

Suitable nanomaterials and nanoparticles are prepared for example by synthesis, chemical reactions, nucleation and crystal growth; crystallization, precipitation; complexation; acid-base reactions; solubilization of metal salts, metal oxides, metal carbonates; carboxylic acid-base reactions; carboxylic acid or carboxylate salt solubilization of metal salts, metal oxides, metal carbonates; metal-carboxylate overbasing; detergent metal-carbonate overbasing; liquid deposition; physical processes of milling, grinding, pulverizing, etc. of bulk materials; colloid processes; jet extrusions, aerosoling, vaporization, vapor deposition, ion beam decomposition; physical separations, chemical separations; deconstruction, decomposition, digestion, delamination, intercalation, etc. of bulk materials; combinations thereof, and the like.

Incorporation of nanomaterials and nanoparticles into heat transfer fluids is improved as needed by use of one or more suitable compatibilizing agents, including for example, solvents, dispersants, detergents, overbased detergents, solubilizing agents; complexing agents, complexing agents having electron donating groups including for example, O, S, N, P—O, heteroatom functional groups, anions, and the like; complexing agents having electron accepting groups including for example, metals, metalloids, B, P, Si, cations, alkali and alkaline earth ions, complex cations, and the like; micelles, micellar complexes, micellar-metal salt complexes, detergent-metal salt complexes, overbased detergent complexes; ionic liquids; hydrocarbyl base oils containing for example, aromatics, heteroaromatics, heteroatoms, polar functional groups, polarizable groups and structures, alcohols, ethers, polyethers, esters, polyesters, carbonates, polycarbonates, amines, polyamines, amides, polyamides, ureas, carboxyl groups, carboxylates, combinations thereof, and the like.

Heat transfer fluids containing nanomaterials and nanoparticles may have advantaged performances and properties including, for example, extended service life, improved oxidation stability, improved thermal stability, improved wear protection, improved extreme pressure wear protection, improved cleanliness, controlled friction, controlled thermal conductivity, controlled heat capacity, controlled electrical conductivity.

The nanomaterials and nanoparticles may be used in an amount of 0.01 to 20 wt %, preferably 0.1 to 10 wt %, more preferably 0.5 to 7.5 wt %, still more preferably 1 to 5 wt % (on an as-received basis) based on the total weight of the heat transfer fluid composition.

When heat transfer fluid compositions contain one or more of the additives discussed above, the additive(s) are blended into the composition in an amount sufficient for it to perform its intended function. Typical amounts of such additives useful in the present disclosure are shown in Table 3 below.

It is noted that many of the additives are shipped from the additive manufacturer as a concentrate, containing one or more additives together, with a certain amount of base oil diluents. Accordingly, the weight amounts in the Table 3 below, as well as other amounts mentioned herein, are directed to the amount of active ingredient (that is the non-diluent portion of the ingredient). The weight percent (wt %) indicated below is based on the total weight of the heat transfer fluid composition.

TABLE 3

Typical Amounts of Heat transfer fluid Components

| Compound | Approximate wt % (Useful) | Approximate wt % (Preferred) |
| --- | --- | --- |
| Antioxidant | 0.01-5 | 0.1-1.5 |
| Corrosion Inhibitor | 0.01-5 | 0.1-2 |
| Antifoam Agent | 0-3 | 0.001-0.15 |

The foregoing additives are all commercially available materials. These additives may be added independently but are usually precombined in packages which can be obtained from suppliers of heat transfer fluid additives. Additive packages with a variety of ingredients, proportions and characteristics are available and selection of the appropriate package will take the requisite use of the ultimate composition into account.

A block diagram of a computer related system 300 useful in this disclosure is shown in FIG. 3. System 300 includes a computer 305 coupled to a network 330, e.g., the Internet.

Computer 305 includes a user interface 310, a processor 315, and a memory 320. Computer 305 may be implemented on a general-purpose microcomputer. Although computer 305 is represented herein as a standalone device, it is not limited to such, but instead can be coupled to other devices (not shown) via network 330.

Processor 315 is configured of logic circuitry that responds to and executes instructions.

Memory 320 stores data and instructions for controlling the operation of processor 315. Memory 320 may be implemented in a random access memory (RAM), a hard drive, a read only memory (ROM), or a combination thereof. One of the components of memory 320 is a program module 325.

Program module 325 contains instructions for controlling processor 315 to execute the methods described herein. For example, as a result of execution of program module 325, processor 315 determines the dimensional effectiveness factor ($DEF_{fluid}$) of the heat transfer fluid, the dimensional effectiveness factor ($DEF_{reference}$) of the reference fluid, and the normalized effectiveness factor ($NEF_{fluid}$) of the heat transfer fluid. The term "module" is used herein to denote a functional operation that may be embodied either as a stand-alone component or as an integrated configuration of a plurality of sub-ordinate components. Thus, program module 325 may be implemented as a single module or as a plurality of modules that operate in cooperation with one another. Moreover, although program module 325 is described herein as being installed in memory 320, and therefore being implemented in software, it could be implemented in any of hardware (e.g., electronic circuitry), firmware, software, or a combination thereof.

User interface 310 includes an input device, such as a keyboard or speech recognition subsystem, for enabling a user to communicate information and command selections to processor 315. User interface 310 also includes an output device such as a display or a printer. A cursor control such as a mouse, track-ball, or joy stick, allows the user to manipulate a cursor on the display for communicating additional information and command selections to processor 315.

Processor 315 outputs, to user interface 310, a result of an execution of the methods described herein. Alternatively, processor 315 could direct the output to a remote device (not shown) via network 330.

While program module 325 is indicated as already loaded into memory 320, it may be configured on a storage medium 335 for subsequent loading into memory 320. Storage medium 335 can be any conventional storage medium that stores program module 325 thereon in tangible form. Examples of storage medium 335 include a floppy disk, a compact disk, a magnetic tape, a read only memory, an optical storage media, universal serial bus (USB) flash drive, a digital versatile disc, or a zip drive. Alternatively, storage medium 335 can be a random access memory, or other type of electronic storage, located on a remote storage system and coupled to computer 305 via network 330.

In an embodiment, the computer related system 300 can include one or more databases configured to store and arrange data in said memory and to interact with the processor. The data includes at least one fluid property selected from the group consisting of density ($\rho$), specific heat ($c_p$), thermal conductivity (k), and dynamic viscosity ($\mu$).

Figure 4:
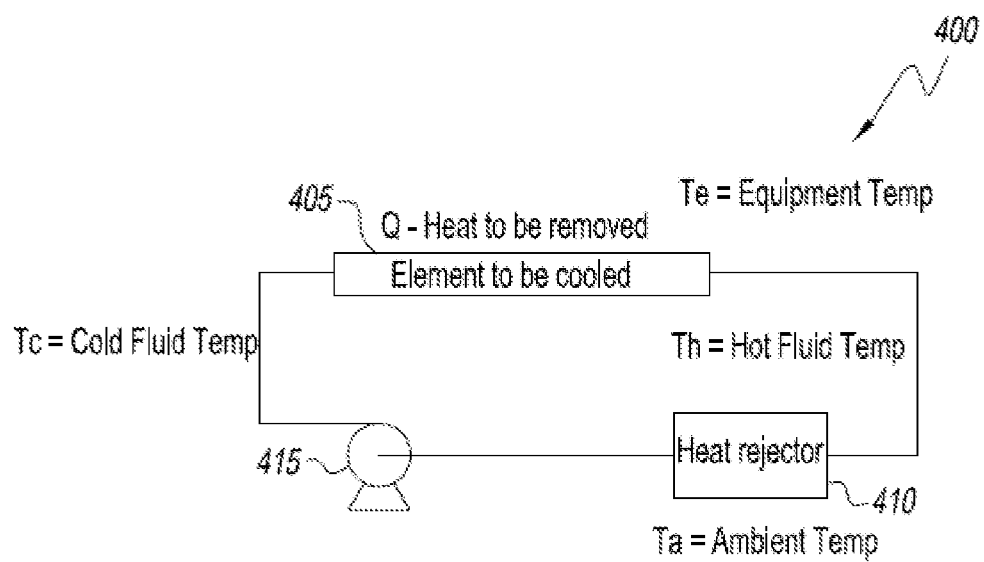
FIG. 4 depicts a schematic of an illustrative heat transfer circuit in accordance with this disclosure.

An illustrative heat transfer circuit 400 of this disclosure is depicted in FIG. 4. An element 405 (with heat transfer area $A_{hot}$) is to be cooled, where a rate of heat conveyance, Q, is required to maintain the element 405 at a temperature of Te. This heat is removed by circulating a fluid with a heat capacity $C_p$ and where the cool fluid enters the element 405 with a temperature of Tc, and leaves the element 405 to be cooled at a temperature Th. The hot fluid then rejects its heat via an element 410, similar to a radiator. This element 410 could reject heat to another heat transfer fluid, or, as illustrated, to air at ambient temperature, Ta. This heat rejection element 410 (with heat transfer area $A_{cold}$) could be a specific device, or, simply heat lost to the atmosphere as the fluid flows through piping. A pump 415 circulates the fluid, at a mass flowrate of $\dot{m}$. At steady state, the rate of heat conveyance is determined by the following equation:

$$Q = \dot{m}°c_p°(Th°-Tc) = \dot{V}\rho°c_p°(Th°-Tc)$$

where $\dot{V}$ is the volumetric flowrate and $\rho$ is the fluid density.

Within the heat transfer circuit 400, cooling of the device can be dominated by the ability of the fluid to "convey heat" from the element 405, or, can be dominated by the "localized heat transfer" mechanisms within element 405. Many different equipment design and operation factors can dictate which of these two phenomena are dominant. For example, in element 405 (i.e., the element to be cooled), localized heat transfer could be enhanced by the inclusion of cooling fins in the equipment design which increases the effective heat transfer area. Similarly, localized heat transfer could be improved by the artificial induction of turbulence or boosted by enhancing fluid/hardware contact via fluid jet flow within the element. For any specific system, whether due to basic design or through targeted design enhancements, it is possible that this localized heat transfer is not the dominant mechanism controlling heat transfer performance, but instead, the fluid's performance is dominated by the ability of the fluid to convey heat away from the element. The maximum amount of heat that could be conveyed by the fluid is given by:

$$Q_{max} = \dot{V}\rho c_p (Te-Ta)$$

The actual heat conveyed from element 405 is given by:

$$Q_{actual} = \dot{V}\rho c_p (Th-Tc)$$

The system is considered to be dominated by localized heat transfer if the actual heat being conveyed is less than or equal to half of maximum amount of heat that could be conveyed, i.e., $$\frac{Q_{actual}}{Q_{max}} \leq 0.5 - \text{"Localized heat transfer dominated"}$$

Conversely, if the actual amount of heat conveyed is more than half of the maximum possible amount of heat that could be conveyed by the fluid, the system is considered to be dominated by "heat conveyance", i.e., $$\frac{Q_{actual}}{Q_{max}} > 0.5 - \text{"Heat conveyance dominated"}$$

Since the Mouromtseff number, Mo, attempts to relate the fluid's localized heat transfer coefficient to fluid properties, historic discussions regarding heat transfer fluids which refer to the Mo are only meaningful in "localized heat transfer dominated" application, and bear little relevance in "heat conveyance dominated" applications. Further, it should be noted that unlike the Mo, the DEF and NEF effectiveness factors described herein capture both the heat transfer performance and the energy required to circulate the fluid.

The following non-limiting examples are provided to illustrate the disclosure.

EXAMPLES

Case 1

In the electric vehicle design addressed in this Case 1, there is a large surface area across which heat is removed from hot surfaces. This is the case when, for instance, the battery to be cooled has a large surface area available for cooling. As a result, the amount of heat flow from the hot surface to the heat transfer fluid is heat conveyance dominated. In the vehicle design addressed in this Case 1, the cooling circuit design produces transitional flow (Reynolds number between around 2100 and around 4000) dominates in the overall system, in order to achieve a balance between the pressure required to circulate the heat transfer fluid and the size and weight of the cooling system. Finally, in the vehicle design addressed in this Case 1, a constant flow (positive displacement) pump is employed, such that the volume of heat transfer fluid being pumped through the system is independent of the properties of the heat transfer fluid.

As a result, in this type of electric vehicle, the normalized effectiveness factor ($NEF_{fluid}$) will be proportional to the following combination of heat transfer fluid properties:

$$\rho^{0.25} * c_p^{1} * \mu^{-0.25}.$$

Case 2

In the electric vehicle design addressed in this Case 2, there is a large surface area across which heat is removed from hot surfaces. This is the case when, for instance, the battery to be cooled has a large surface area available for cooling. As a result, the amount of heat flow from the hot surface to the heat transfer fluid is heat conveyance dominated. In the vehicle design addressed in this Case 2, the cooling circuit design produces laminar flow (Reynolds number less than around 2100) throughout the system, in order to protect against damage to sensitive components such as electronics and minimize the pressure required to circulate the heat transfer fluid. Finally, in the vehicle design addressed in this Case 2, a constant flow (positive displacement) pump is employed, such that the volume of heat transfer fluid being pumped through the system is independent of the properties of the heat transfer fluid.

As a result, in this type of electric vehicle, the normalized effectiveness factor ($NEF_{fluid}$) will be proportional to the following combination of heat transfer fluid properties:

$$\rho^{1} * c_p^{1} * \mu^{-1}.$$

Preparation of Heat Transfer Fluid Formulations and Testing Results

All of the ingredients used in the heat transfer fluid formulations are commercially available. Heat transfer fluid formulations were prepared as described herein.

Optional additives used in the formulations include conventional additives in conventional amounts. Optional additives were one or more of an antioxidant, corrosion inhibitor, antifoam agent, and antiwear additive.

Heat transfer fluids were prepared by blending at least one base stock, with one or more additives selected from an antioxidant, corrosion inhibitor, antifoam agent, and antiwear additive.

Density ($\rho$) was measured in accordance with ASTM D8085 or D4052. Specific heat ($c_p$) was measured by ASTM E1269. Dynamic viscosity ($\mu$) was measured by ASTM D8085 or derived from ASTM D445 and ASTM D4052.

Dimensional effectiveness factor ($DEF_{fluid}$) equations for situations where heat conveyance is the dominant mechanism controlling performance of the heat transfer fluid in an application are given in Table 1 herein.

The normalized effectiveness factor ($NEF_{fluid}$) was determined by the equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 herein for a selected pump and a selected cooling circuit dominant flow regime; and wherein $DEF_{reference}$ is a dimensional effectiveness factor for a reference fluid that is determined using the same equation designated in Table 1 for $DEF_{fluid}$ above for the same selected pump and the same selected cooling circuit dominant flow regime. Both $DEF_{fluid}$ and $DEF_{reference}$ were determined at the same predetermined temperature (i.e., 40° C. or 80° C.), and matching units for each property were used in each equation.

Formulations and properties, dimensional effectiveness factor ($DEF_{fluid}$) values, and normalized effectiveness factor ($NEF_{fluid}$) values, for reference fluids and heat transfer fluids at a temperature of 40° C., where heat conveyance is the dominant mechanism controlling performance of the reference fluid and heat transfer fluid in an application, are shown in FIG. 1.

Formulations and properties, dimensional effectiveness factor ($DEF_{fluid}$) values, and normalized effectiveness factor ($NEF_{fluid}$) values, for reference fluids and heat transfer fluids at a temperature of 80° C., where heat conveyance is the dominant mechanism controlling performance of the reference fluid and heat transfer fluid in an application, are shown in FIG. 2.

Additional Embodiments

1. A heat transfer fluid for use in a heat transfer system, said heat transfer fluid comprising:

at least one non-aqueous dielectric heat transfer fluid, said non-aqueous dielectric heat transfer fluid having density ($\rho$), specific heat (cp), and dynamic viscosity ($\mu$) properties;

wherein the heat transfer system comprises an apparatus and a heat transfer circuit, where said heat transfer circuit comprises:

a pump, a conduit, and a heat exchanger;

wherein the pump is at least one pump selected from the group consisting of: a positive displacement pump and a centrifugal pump;

wherein the heat transfer fluid circulating through the heat transfer circuit has a heat transfer circuit dominant flow regime selected from the group consisting of: laminar flow and transition flow;

wherein the heat transfer system is heat conveyance dominated; and wherein the heat transfer fluid has a normalized effectiveness factor ($NEF_{fluid}$) as determined by the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime and wherein all fluid measurements are made at a temperature of 40° C.;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime;

wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0.

2. The heat transfer fluid of clause 1 having a $NEF_{fluid}$ value from equal to or greater than 1.0 to about 1.5.

3. The heat transfer fluid of clauses 1 and 2 wherein the predetermined temperature is the mean heat transfer fluid temperature in an apparatus heat transfer application.

4. The heat transfer fluid of clauses 1 and 2 wherein the predetermined temperature is between about −40° C. and about 125° C.

5. The heat transfer fluid of clauses 1-4 wherein the apparatus is an electrical apparatus.

6. The heat transfer fluid of clauses 1-5 which is at least one fluid selected from the group consisting of a Group I base oil, Group II base oil, Group III base oil, Group IV base oil, and Group V base oil.

7. The heat transfer fluid of clauses 1-5 which is at least one fluid selected from the group consisting of an aromatic hydrocarbon, polyolefin, paraffin, isoparaffin, ester, ether, fluorinated fluid, nano fluid, and silicone oil.

8. The heat transfer fluid of clauses 1-5 which is a polyolefin.

9. The heat transfer fluid of clauses 1-8 wherein the reference fluid is at least one fluid selected from the group consisting of biphenyl 26.5 wt %+diphenyl oxide 73.5 wt %, siloxane (>95%, KV100 16.6cSt), organosilicate ester (>90%, KV100 0.93cSt), organosilicate ester (>90%, KV100 1.6cSt), perfluoro fluid C5-C8 (KV25 2.2cSt), and 3-ethoxy-1,1,1,2,3,4,4,5,5,6,6,6-dodecafluoro-2-trifluoromethyl-hexane (>99%).

10. The heat transfer fluid of clauses 1-9 which further comprises one or more additives.

11. The heat transfer fluid of clause 10 wherein the one or more additives is at least one additive selected from the group consisting of an antioxidant, a corrosion inhibitor, an antifoam agent, an antiwear additive, nanomaterials, nanoparticles, and combinations thereof.

12. The heat transfer fluid of clauses 1-11 wherein the apparatus comprises an electric vehicle, a computer server farm, a charging station, or a rechargeable battery system.

13. A method for improving performance of a heat transfer system, said method comprising:
  (i) providing an apparatus having a heat transfer system, said heat transfer system comprising a heat transfer circuit, where said heat transfer circuit comprises:
    a pump,
    a conduit, and
    a heat exchanger;
  wherein the pump is at least one pump selected from the group consisting of: a positive displacement pump and a centrifugal pump;
  (ii) circulating at least one non-aqueous dielectric heat transfer fluid through the heat transfer circuit to transfer heat with the apparatus, said non-aqueous dielectric heat transfer fluid having density (ρ), specific heat ($c_p$), and dynamic viscosity (μ) properties;
  wherein the heat transfer fluid circulating through the heat transfer circuit has a heat transfer circuit dominant flow regime selected from the group consisting of: laminar flow and transition flow;
  wherein the heat transfer system is heat conveyance dominated; and
  (iii) determining a normalized effectiveness factor ($NEF_{fluid}$) of the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime;

wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | whereby performance of the heat transfer system during operation is improved using a heat transfer fluid having a $NEF_{fluid}$ value equal to or greater than 1.0.

14. A method for improving performance of an apparatus, said method comprising:
  (i) providing an apparatus having a heat transfer system, said heat transfer system comprising a heat transfer circuit, where said heat transfer circuit comprises:
    a pump,
    a conduit, and
    a heat exchanger;
  wherein the pump is at least one pump selected from the group consisting of: a positive displacement pump and a centrifugal pump;
  (ii) circulating at least one non-aqueous dielectric heat transfer fluid through the heat transfer circuit to transfer heat with the apparatus, said non-aqueous dielectric heat transfer fluid having density (ρ), specific heat ($c_p$), and dynamic viscosity (μ) properties;
  wherein the heat transfer fluid circulating through the heat transfer circuit has a heat transfer circuit dominant flow regime selected from the group consisting of: laminar flow and transition flow;
  wherein the heat transfer system is heat conveyance dominated; and
  (iii) determining a normalized effectiveness factor ($NEF_{fluid}$) of the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime;

wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | whereby performance of the apparatus during operation is improved using a heat transfer fluid having a $NEF_{fluid}$ value equal to or greater than 1.0.

15. A method for selecting a heat transfer fluid for use in a heat transfer system, said method comprising:

(i) providing an apparatus having a heat transfer system, said heat transfer system comprising a heat transfer circuit, where said heat transfer circuit comprises:
  a pump,
  a conduit, and
  a heat exchanger;

(ii) circulating at least one non-aqueous dielectric heat transfer fluid through the heat transfer circuit to transfer heat with the apparatus, said non-aqueous dielectric heat transfer fluid having density ($\rho$), specific heat ($c_p$), and dynamic viscosity ($\mu$) properties;

(iii) selecting a type of pump used in the heat transfer circuit, wherein the pump is at least one pump selected from the group consisting of: a positive displacement pump and a centrifugal pump;

(iv) selecting a heat transfer circuit dominant flow regime used to circulate the heat transfer fluid through the heat transfer circuit; wherein the heat transfer circuit dominant flow regime is selected from the group consisting of: laminar flow and transition flow;

(v) conducting the heat transfer system such that it is heat conveyance dominated;

(vi) determining a normalized effectiveness factor ($NEF_{fluid}$) for the heat transfer fluid from the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for the selected pump and the selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime;

wherein $DEF_{fluid}$ and $DEF_{reference}$ are determined at a predetermined temperature in an apparatus heat transfer application, and matching units for each property are used in each equation; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ |

(vii) selecting the heat transfer fluid for use in the heat transfer system if the $NEF_{fluid}$ for the heat transfer fluid is a value equal to or greater than 1.0.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A heat transfer fluid for use in a heat transfer system, said heat transfer fluid comprising:
  at least one non-aqueous dielectric heat transfer fluid, said non-aqueous dielectric heat transfer fluid having density ($\rho$), specific heat (cp), and dynamic viscosity ($\mu$) properties;
  wherein the heat transfer system comprises an apparatus and a heat transfer circuit, where said heat transfer circuit comprises:
    a pump,
    a conduit, and
    a heat exchanger;

wherein the pump is at least one pump selected from the group consisting of: a positive displacement pump and a centrifugal pump;

wherein the heat transfer fluid circulating through the heat transfer circuit has a heat transfer circuit dominant flow regime selected from the group consisting of: laminar flow and transition flow;

wherein the heat transfer system is heat conveyance dominated; and wherein the heat transfer fluid has a normalized effectiveness factor ($NEF_{fluid}$) as determined by the following equation:

$$NEF_{fluid} = \frac{DEF_{fluid}}{DEF_{reference}}$$

wherein $DEF_{fluid}$ is a dimensional effectiveness factor for the heat transfer fluid that is determined based on an equation designated in Table 1 below for a selected pump and a selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime wherein the reference fluid is biphenyl 26.5 wt %+diphenyl oxide 73.5 wt %;

wherein $DEF_{fluid}$ and $DEF_{reference}$ are determined at temperature of 40° C. in an apparatus heat transfer application, and matching units for each property are used in each equation; and

TABLE 1

(Heat Transfer Fluid and Reference Fluid)

| Selected Pump | Selected Heat Transfer Circuit Flow Regime | |
|---|---|---|
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0.

2. The heat transfer fluid of claim 1 having a $NEF_{fluid}$ value greater than 1.1.

3. The heat transfer fluid of claim 1 having a $NEF_{fluid}$ value greater than 1.2.

4. The heat transfer fluid of claim 1 having a $NEF_{fluid}$ value greater than 1.3.

5. The heat transfer fluid of claim 1 having a $NEF_{fluid}$ value greater than 1.4.

6. The heat transfer fluid of claim 1 having a $NEF_{fluid}$ value greater than 1.5.

7. The heat transfer fluid of claim 1 having a $NEF_{fluid}$ value from equal to or greater than 1.0 to about 1.5.

8. The heat transfer fluid of claim 1 which comprises at least one fluid selected from the group consisting of a Group I base oil, Group II base oil, Group III base oil, Group IV base oil, and Group V base oil.

9. The heat transfer fluid of claim 1 which comprises at least one fluid selected from the group consisting of an aromatic hydrocarbon, polyolefin, paraffin, isoparaffin, ester, ether, fluorinated fluid, nano fluid, and silicone oil.

10. The heat transfer fluid of claim 9 which is a polyolefin.

11. The heat transfer fluid of claim 1 wherein heat transfer fluid comprises one or more additives selected from the group consisting of an antioxidant, a corrosion inhibitor, an antifoam agent, an antiwear additive, nanomaterials, nanoparticles, and combinations thereof.

12. The heat transfer fluid of claim 1 wherein the apparatus comprises an electric vehicle, a computer server farm, a charging station, or a rechargeable battery system.

13. The heat transfer fluid of claim 1 wherein the apparatus comprises an electric motor, generator, rechargeable battery, AC-DC/DC-AC/AC-AC/DC-DC converter, transformer, power management system, electronics controlling a battery, on-board power electronics, super fast charging system, fast charging equipment at a charging station, stationary super fast charger, or on-board charger.

14. The heat transfer fluid of claim 1 wherein the dimensional effectiveness factor ($DEF_{fluid}$) of the heat transfer fluid, the dimensional effectiveness factor ($DEF_{reference}$) of the reference fluid, and the normalized effectiveness factor ($NEF_{fluid}$) of the heat transfer fluid, are determined by a system having a computer, a processor, a memory, and a program module, wherein the program module contains instructions for controlling the processor to determine the dimensional effectiveness factor ($DEF_{fluid}$) of the heat transfer fluid, the dimensional effectiveness factor ($DEF_{reference}$) of the reference fluid, and the normalized effectiveness factor ($NEF_{fluid}$) of the heat transfer fluid.

15. The heat transfer fluid of claim 14 wherein the system further comprises one or more databases configured to store and arrange data in said memory and to interact with the processor, the data comprising at least one fluid property selected from the group consisting of density ($\rho$), specific heat ($c_p$), thermal conductivity (k), and dynamic viscosity ($\mu$).

16. A heat transfer fluid for use in a heat transfer system, said heat transfer fluid comprising:

at least one non-aqueous dielectric heat transfer fluid, said non-aqueous dielectric heat transfer fluid having density ($\rho$), specific heat ($c_p$), and dynamic viscosity ($\mu$) properties;

wherein the heat transfer system comprises an apparatus and a heat transfer circuit, where said heat transfer circuit comprises:
  a pump,
  a conduit, and
  a heat exchanger;

wherein the pump is at least one pump selected from the group consisting of: a positive displacement pump and a centrifugal pump;

wherein the heat transfer fluid circulating through the heat transfer circuit has a heat transfer circuit dominant flow regime selected from the group consisting of: laminar flow and transition flow;

wherein the heat transfer system is heat conveyance dominated; and wherein the heat transfer fluid has a normalized effectiveness factor ($NEF_{fluid}$) as determined by the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime wherein the reference fluid is biphenyl 26.5 wt %+diphenyl oxide 73.5 wt %;

wherein $DEF_{fluid}$ and $DEF_{reference}$ are determined at temperature of 80° C. in an apparatus heat transfer application, and matching units for each property are used in each equation; and

TABLE 1

(Heat Transfer Fluid and Reference Fluid)

| Selected Pump | Selected Heat Transfer Circuit Flow Regime | |
| --- | --- | --- |
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0.

17. The heat transfer fluid of claim 16 having a $NEF_{fluid}$ value greater than 1.3.

18. The heat transfer fluid of claim 16 having a $NEF_{fluid}$ value greater than 1.5.

19. The heat transfer fluid of claim 16 having a $NEF_{fluid}$ value from equal to or greater than 1.0 to about 1.5.

20. A heat transfer fluid for use in an electric vehicle battery heat transfer system, said heat transfer fluid comprising:
- at least one non-aqueous dielectric heat transfer fluid selected from selected from the group consisting of an aromatic hydrocarbon, polyolefin, paraffin, isoparaffin, ester, ether, fluorinated fluid, nano fluid, and silicone oil, said non-aqueous dielectric heat transfer fluid having density ($\rho$), specific heat ($c_p$), and dynamic viscosity ($\mu$) properties;
- wherein the heat transfer fluid comprises one or more additives selected from the group consisting of an antioxidant, a corrosion inhibitor, an antifoam agent, an antiwear additive, nanomaterials, nanoparticles, and combinations thereof;
- wherein the heat transfer system comprises an apparatus and a heat transfer circuit, where said heat transfer circuit comprises:
  - a pump,
  - a conduit, and
  - a heat exchanger;
- wherein the pump is at least one pump selected from the group consisting of: a positive displacement pump and a centrifugal pump;
- wherein the heat transfer fluid circulating through the heat transfer circuit has a heat transfer circuit dominant flow regime selected from the group consisting of: laminar flow and transition flow;
- wherein the heat transfer system is heat conveyance dominated; and
- wherein the heat transfer fluid has a normalized effectiveness factor ($NEF_{fluid}$) as determined by the following equation:

$$NEF_{fluid} = \frac{DEF_{fluid}}{DEF_{reference}};$$

wherein $DEF_{fluid}$ is a dimensional effectiveness factor for the heat transfer fluid that is determined based on an equation designated in Table 1 below for a selected pump and a selected heat transfer circuit dominant flow regime;

wherein $DEF_{reference}$ is a dimensional effectiveness factor for a reference fluid that is determined using the same equation designated in Table 1 for $DEF_{fluid}$ above for the same selected pump and the same selected heat transfer circuit dominant flow regime wherein the reference fluid is biphenyl 26.5 wt %+diphenyl oxide 73.5 wt %;

wherein $DEF_{fluid}$ and $DEF_{reference}$ are determined at temperature of 80° C. in an apparatus heat transfer application, and matching units for each property are used in each equation; and

TABLE 1

(Heat Transfer Fluid and Reference Fluid)

| Selected Pump | Selected Heat Transfer Circuit Flow Regime | |
| --- | --- | --- |
| | Laminar | Transition (Blasius) |
| Positive Displacement Pump | $\rho^1 c_p^1 \mu^{-1}$ | $\rho^{0.25} c_p^1 \mu^{-0.25}$ |
| Centrifugal Pump | $\rho^{0.19} c_p^1 \mu^{-0.19}$ | $\rho^{0.04} c_p^1 \mu^{-0.04}$ | wherein the heat transfer fluid has a $NEF_{fluid}$ value equal to or greater than 1.0.

* * * * *